(12) United States Patent
Cui et al.

(10) Patent No.: US 11,039,474 B2
(45) Date of Patent: Jun. 15, 2021

(54) ELECTRONIC DEVICE AND METHOD FOR WIRELESS COMMUNICATION

(71) Applicant: Sony Corporation, Tokyo (JP)

(72) Inventors: Tao Cui, Beijing (CN); Xin Guo, Beijing (CN); Chen Sun, Beijing (CN)

(73) Assignee: SONY CORPORATION, Tokyo (JP)

( * ) Notice: Subject to any disclaimer, the term of this patent is extended or adjusted under 35 U.S.C. 154(b) by 133 days.

(21) Appl. No.: 16/330,773

(22) PCT Filed: Mar. 14, 2018

(86) PCT No.: PCT/CN2018/078929
§ 371 (c)(1),
(2) Date: Mar. 6, 2019

(87) PCT Pub. No.: WO2018/171475
PCT Pub. Date: Sep. 27, 2018

(65) Prior Publication Data
US 2020/0187253 A1 Jun. 11, 2020

(30) Foreign Application Priority Data

Mar. 23, 2017 (CN) .......................... 201710177993.3

(51) Int. Cl.
*H04W 74/08* (2009.01)
*H04W 16/14* (2009.01)
(Continued)

(52) U.S. Cl.
CPC ....... *H04W 74/0816* (2013.01); *H04W 16/14* (2013.01); *H04W 28/26* (2013.01); *H04W 72/005* (2013.01); *H04W 72/0453* (2013.01); *H04W 72/0493* (2013.01); *H04W 74/004* (2013.01)

(58) Field of Classification Search
USPC .......................................................... 370/329
See application file for complete search history.

(56) References Cited

U.S. PATENT DOCUMENTS

2012/0329449 A1* 12/2012 Das .................. H04W 52/0206
 455/423
2015/0334653 A1  11/2015 Ang et al.
(Continued)

FOREIGN PATENT DOCUMENTS

CN       106162898 A      11/2016
CN       106465275 A       2/2017
(Continued)

OTHER PUBLICATIONS

International Search Report dated May 16, 2018 for PCT/CN2018/078929 filed on Mar. 14, 2018, 9 pages including English Translation.

*Primary Examiner* — Gregory B Sefcheck
*Assistant Examiner* — Majid Esmaeilian
(74) *Attorney, Agent, or Firm* — Xsensus LLP

(57) ABSTRACT

Provided are an electronic device and method for wireless communication, wherein the electronic device comprises: a processing circuit configured as: detecting whether an unlicensed frequency band is idle; and when the unlicensed frequency band is detected idle, determining a transmission resource, to be used, of the unlicensed frequency band.

17 Claims, 13 Drawing Sheets

(51) Int. Cl.
*H04W 28/26* (2009.01)
*H04W 72/04* (2009.01)
*H04W 72/00* (2009.01)
*H04W 74/00* (2009.01)

(56) References Cited

U.S. PATENT DOCUMENTS

2017/0142737 A1* 5/2017 Zheng ............... H04W 72/0446
2017/0277575 A1* 9/2017 Wang ....................... H04L 67/10
2017/0324276 A1* 11/2017 Yoo ..................... H02J 13/0062
2018/0295004 A1 10/2018 Gou et al.
2018/0376339 A1* 12/2018 Hu ........................ H04W 16/14

FOREIGN PATENT DOCUMENTS

CN 106507486 A 3/2017
WO 2016/163709 A1 10/2016

* cited by examiner

ELECTRONIC DEVICE AND METHOD FOR WIRELESS COMMUNICATION

CROSS-REFERENCE TO RELATED APPLICATIONS

This application is based on PCT filing PCT/CN2018/078929, filed Mar. 14, 2018, which claims the priority to Chinese Patent Application No. 201710177993.3, titled "ELECTRONIC DEVICE AND METHOD FOR WIRELESS COMMUNICATION", filed with the China National Intellectual Property Administration on Mar. 23, 2017, which is incorporated herein by reference in its entirety.

FIELD OF THE INVENTION

Embodiments of the present disclosure generally relate to the technical field of wireless communications, particularly to uplink transmission resources allocation in wireless communications using an unlicensed frequency band, and more particularly to an electronic apparatus and a method for wireless communications capable of implementing uplink grant-free scheduling.

BACKGROUND OF THE INVENTION

Based on the discussion in a first phase of the New Radio (NR), the Ultra reliable and low latency communication (URLLC) is an important application scenario necessary to be considered for the 5G licensed frequency band. In the URLLC scenario, the latency required by the user plane is 0.5 ms, which is 20 times stricter than the latency of 10 ms of the requirement of the user plane specified in the LTE. In order to meet the requirement of the URLLC, the change in the fame structure such as the mini-slot and the reduction of the TTI may be adopted. In this case, a minimum unit for scheduling and feedback is reduced to meet the basic requirement of the ultra-low latency. In addition, an uplink grant-free scheduling scheme is further proposed to save signaling overhead as much as possible, so as to further reduce the latency. In the uplink grant-free scheduling, after the User Equipment (UE) achieves uplink synchronization with the base station, the UE may directly transmit the uplink data without the need of the uplink grant and scheduling information transmitted by the base station.

In addition, in the upcoming NR era, with the development of the Internet of Everything, the support for the unlicensed frequency band will be greatly promoted compared with the licensed access-assisted access (LAA) in the LTE era, and operations on the unlicensed frequency band in a standalone form has been introduced in the proposal for the future standard development (a second phase of the NR). Therefore, research on the use of the unlicensed frequency band draws more and more attention. However, for the unlicensed frequency band, since it is required to detect whether a channel is idle before the unlicensed frequency band is used, the mechanism itself results in latency. Further, the latency is aggravated by the uplink grant scheduling. In this case, how to reduce the latency on the unlicensed frequency band becomes an urgent problem to be solved.

SUMMARY OF THE INVENTION

In the following, an overview of the present invention is given simply to provide basic understanding to some aspects of the present invention. It should be understood that this overview is not an exhaustive overview of the present invention. It is not intended to determine a critical part or an important part of the present invention, nor to limit the scope of the present invention. An object of the overview is only to give some concepts in a simplified manner, which serves as a preface of a more detailed description described later.

According to an aspect of the present disclosure, an electronic apparatus for wireless communications is provided. The electronic apparatus includes processing circuitry, which is configured to: detect whether an unlicensed frequency band is idle; and determine transmission resources to be used on the unlicensed frequency band, in the case of detecting that the unlicensed frequency band is idle.

According to another aspect of the present disclosure, an electronic apparatus for wireless communications is provided. The electronic apparatus includes processing, circuitry, which is configured to generate, based on a distribution of network nodes, an energy resource mapping table which denotes correspondence between energy of a first broadcast signal received by a network node and transmission resources to be used on an unlicensed frequency band; and generate, based on the energy resource mapping table, the first broadcast signal with particular energy.

According to another aspect of the present disclosure, a method for wireless communications is provided. The method includes: detecting whether an unlicensed frequency band is idle; and determining transmission resources to be used on the unlicensed frequency band, in the case of detecting that the unlicensed frequency band is idle.

According to another aspect of the present disclosure, a method for wireless communications is provided. The method includes: generating, based on a distribution of network nodes, an energy resource mapping table which denotes correspondence between energy of a first broadcast signal received by a network node and transmission resources to be used on an unlicensed frequency band; and generating, based on the energy resource mapping table, the first broadcast signal with particular energy.

According to other aspects of the present disclosure, there are further provided computer program codes and computer program products for the methods for wireless communications as well as a computer-readable storage medium recording the computer program codes for implementing the methods.

With the electronic apparatus and the method according to the embodiments of the present disclosure, uplink grant-free scheduling can implemented on an unlicensed frequency band, thereby simplifying the signaling flow, and realizing ultra-low latency while avoiding or mitigating resources selection collision caused by there being no uplink scheduling.

These and other advantages of the present disclosure will be more apparent by illustrating in detail a preferred embodiment of the present invention in conjunction with accompanying drawings below.

BRIEF DESCRIPTION OF THE DRAWINGS

To further set forth the above and other advantages and features of the present invention, detailed description will be made in the following taken in conjunction with accompanying drawings in which identical or like reference signs designate identical or like components. The accompanying drawings, together with the detailed description below, are incorporated into and form a part of the specification. It should be noted that the accompanying drawings only illustrate, by way of example, typical embodiments of the present invention and should not be construed as a limitation to the scope of the invention. In the accompanying drawings.

DETAILED DESCRIPTION OF EMBODIMENTS

An exemplary embodiment of the present invention will be described hereinafter in conjunction with the accompanying drawings. For the purpose of conciseness and clarity, not all features of an embodiment are described in this specification. However, it should be understood that multiple decisions specific to the embodiment have to be made in a process of developing any such embodiment to realize a particular object of a developer, for example, conforming to those constraints related to a system and a business, and these constraints may change as the embodiments differs.

Furthermore, it should also be understood that although the development work may be very complicated and time-consuming, for those skilled in the art benefiting from the present disclosure, such development work is only a routine task.

Here, it should also be noted that in order to avoid obscuring the present invention due to unnecessary details, only a device structure and/or processing steps closely related to the solution according to the present invention are illustrated in the accompanying drawing, and other details having little relationship to the present invention are omitted.

First Embodiment

As mentioned above, in a currently-discussed URLLC scenario, the uplink grant-free scheduling is performed on the licensed frequency band of the NR. In the future development, it deserves to be studied how to introduce the uplink grant-free scheduling on an unlicensed frequency band of the NR in a licensed-assisted access manner such as the LAA. A solution for uplink grant-free scheduling on an unlicensed frequency band is provided in this embodiment. It should be understood that although the description is given by taking the URLLC scenario as an example herein, the technology may be applied to any scenario in which an uplink grant-free scheduling may be performed on an unlicensed frequency band, which is not limited to the URLLC scenario.

In this embodiment, a network control terminal may provide wireless communication service for a network node on a licensed frequency band and an unlicensed frequency band. The network control terminal may be an entity in a communication system for implementing functions such as setting, control, and communication resource allocation for the communication activity, for example, a base station in a cellular communication system, or a baseband cloud device under a Cloud-RAN/Centralized-RAN (C-RAN) architecture (in which a cell may not exist), such as any BBUs that are in high speed communication with each other in a BBU pool under the C-RAN architecture. The network node may be an entity that achieves its communication object by using communication resources in a communication system, for example, various user equipments (such as mobile terminals, smart vehicles, smart wearable devices having a cellular communication capability) or network infrastructures such as a small cell base station.

Figure 1:
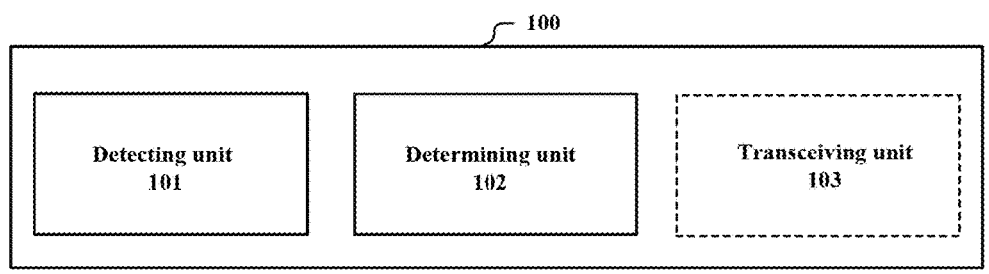
FIG. 1 is a block diagram showing functional modules of an electronic apparatus for wireless communications according to an embodiment of the present disclosure.

FIG. 1 is a block diagram showing functional modules of an electronic apparatus 100 for wireless communications according to an embodiment of the present disclosure. As shown in FIG. 1, the electronic apparatus 100 includes: a detecting unit 101, configured to detect whether an unlicensed frequency band is idle, and a determining unit 102, configured to determine transmission resources to be used on the unlicensed frequency band, in the case of detecting that the unlicensed frequency band is idle.

The detecting unit 101 and the determining unit 102 may be implemented, for example, by one or more processing circuitries, and the processing circuits may be implemented, for example, as a chip.

For an unlicensed frequency band, in a case that a network node is required to perform transmission using spectrum resources, it needs to first detect whether a channel or a carrier of the unlicensed frequency band is occupied, and can use the spectrum resources only in the case that the channel or the carrier of the unlicensed frequency band is idle. Generally, the process of detecting whether a channel or a carrier is idle is called Listen Before Talk (LBT), which may guarantee fair and effective usage of the unlicensed frequency band. LBT is to check whether the channel is idle by means of Clear Channel Assessment (CCA) before using the channel or the carrier.

Different from the procedure of a grant based uplink scheduling, in the case of the uplink grant-free scheduling, the network node cannot learn the uplink transmission resources such as Physical Uplink Shared Channel (PUSCH) resources allocated for it by the base station via licensed scheduling signaling of a network control terminal, specifically, such as a start Physical Resource Block (PRB) position, a Modulation and Coding Scheme (MCS) level, a modulation pattern and so on. In this case, in order to avoid collision of resource access, the transmission resources to be used on the unlicensed frequency band are required to be determined first. Compared with the uplink grant scheduling, the determining unit 102 performs the determination based on a manner of implicit resource allocation notification.

In an example, the determining unit 102 senses a first broadcast signal transmitted by a network control terminal and determines the transmission resources based on the first broadcast signal. For example, the determining unit 102 may sense energy of the first broadcast signal, which is hereinafter also referred to as Energy Indication Assessment (EIA). The first broadcast signal may be broadcasted on a licensed frequency band or on an unlicensed frequency band. For example, the first broadcast signal may be transmitted periodically or continuously. In the case of being transmitted periodically, for example, a transmission period may be set to cause the network node to detect the first broadcast signal in time.

In the case that the first broadcast signal is transmitted on the licensed frequency band, the determining unit 102 may sense the first broadcast signal at any time before transmission on the unlicensed frequency band is performed, for example, before the LBT on the unlicensed frequency band is performed, or during a process that the CCA is performed in the LBT, or in a latency time period after the CCA is completed in the LBT.

Figure 2:
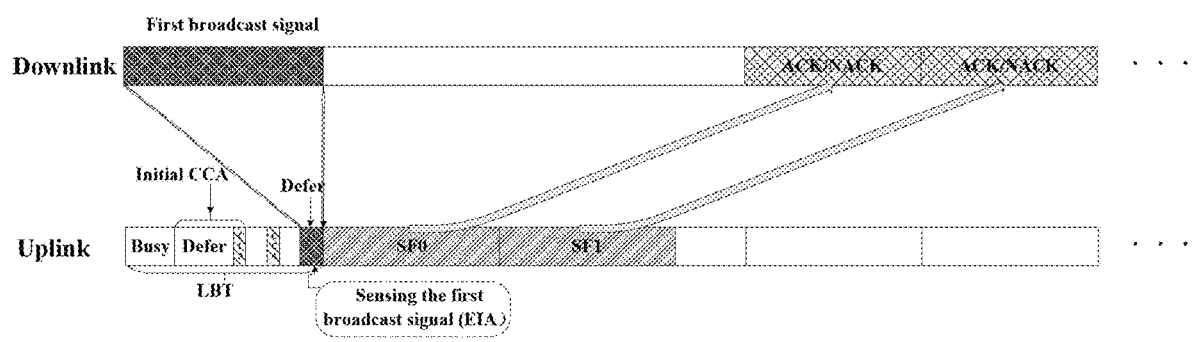
FIG. 2 is a diagram schematically showing timing of sensing a first broadcast signal.

On the other hand, in the case that the first broadcast signal is transmitted on the unlicensed frequency band, the determining unit 102 may sense the first broadcast signal in a latency time period after the CCA succeeds in the LBT, as schematically shown in FIG. 2. The first broadcast signal is transmitted continuously, and the determining unit 102 senses the first broadcast signal after it is detected that the channel is idle (i.e., the CCA succeeds) in the process of LBT. For example, the energy of the first broadcast signal may be set to be much less than an energy detection threshold for determining coexistence in the LBT mechanism, so as not to interfere the determination with respect to whether can access the unlicensed frequency band. Moreover, in other examples, the unlicensed frequency band for transmitting the first broadcast signal may be different from the unlicensed frequency band to be used by the network node, so as to effectively distinguish and avoid the interference. Further, the LBT shown in FIG. 2 is only an example of the LBT mechanism, which is not limited thereto. Various LBT mechanisms may be employed, for example, a LBT mechanism of 2.5 μs proposed in the RAN1#84, a Cat4.LBT mechanism, or the like.

Figure 3:
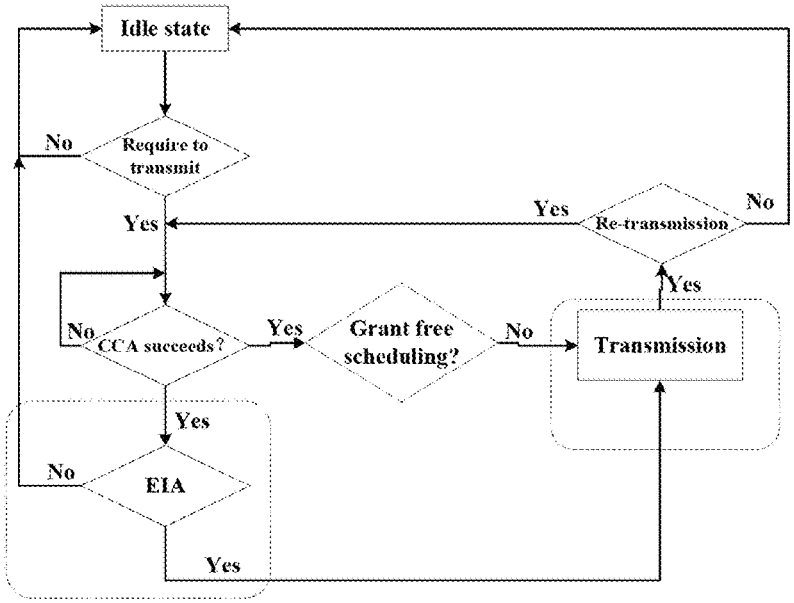
FIG. 3 is a schematic diagram showing a flow of transmission in the case of an Energy Indication Assessment (EIA) in combination with a LBT mechanism of 25 μs.

For example, in the case of the EIA in combination with the LBT mechanism of 25 μs, the network node may detect the first broadcast signal under a condition of ensuring the initial CCA being successfully completed, to determine an energy range for the resource allocation, so as to determine the transmission resources. FIG. 3 is a schematic diagram showing a flow of transmission in the case of an EIA in combination with the LBT mechanism of 25 μs. A dashed line block on a left side in FIG. 3 denotes the EIA, which is independently performed after the CCA of 25 μs succeeds. Therefore, if it is detected that the current access channel is not occupied by other network nodes by means of the CCA, the resources that may be used for uplinked transmission are located after the network node has performed the EIA shown in the dashed line block on the left side. It can be seen that the transmission in a dashed line block on a right side in FIG. 3 is performed based on the success of the CCA and EIA. For example, in a case that the EIA detection fails, for example, the first broadcast signal cannot be detected or the energy of the first broadcast signal is not in a valid range, the system returns to an idle state. Further, if there is a new transmission request after the transmission ends, the LBT process is performed again. In addition, after the CCA succeeds, whether an uplink grant-free scheduling mechanism is currently used may be determined in advance, as shown by a diamond dashed line block in FIG. 3. If it is determined that the uplink grant-free scheduling mechanism is currently used, the EIA in the dashed line block on the left is performed, which may be performed synchronously with a process of transmitting a channel reservation signal in the CCA; otherwise the uplink transmission is directly performed after the timeslot boundaries are aligned.

Figure 4:
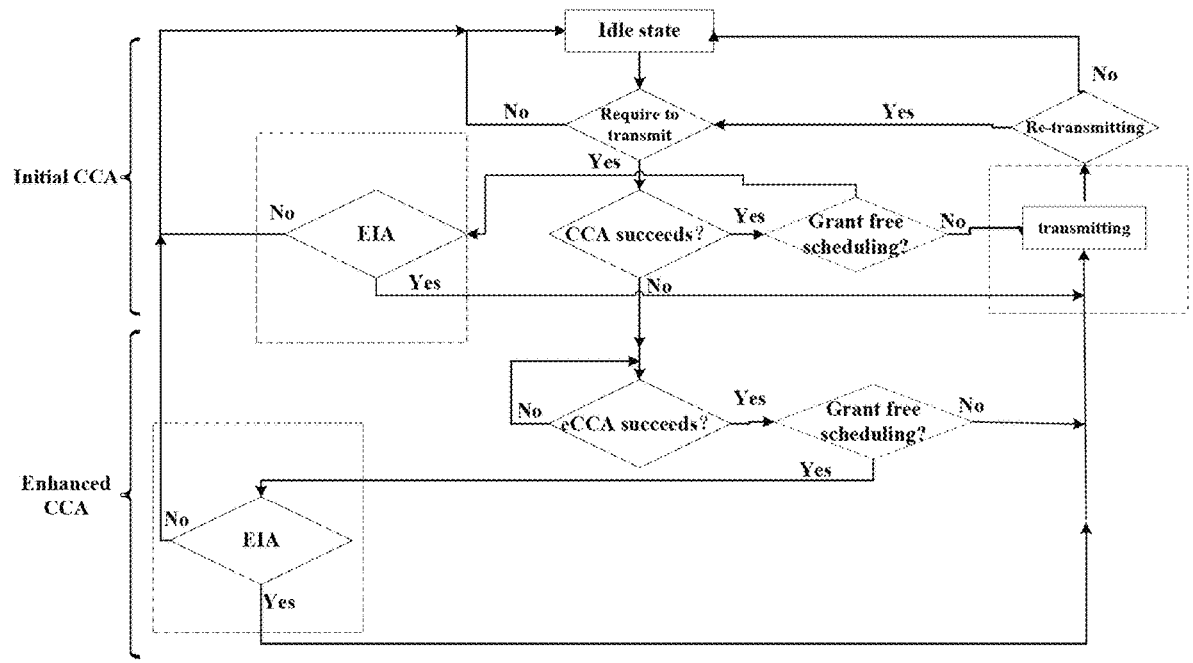
FIG. 4 is a schematic diagram showing a flow of transmission in the case of an EIA in combination a Cat. 4 LBT mechanism.

As another example, the EIA may be used in combination with an uplink Cat.4 LBT mechanism. The uplink Cat.4 LBT mechanism is a mechanism which is determined, based on a downlink Cat.4LBT, by adjusting a contention window size and a backoff length to specifically suit to the uplink LAA. Compared with the LBT of 25 μs, the portion of an extended CCA is added in the uplink Cat.4 LBT, that is, the process continues to detect whether a channel is occupied after the initial CCA fails, so the EIA may be performed after the initial CCA succeeds or the extended CCA (eCCA) succeeds, as shown in FIG. 4. The EIA in the dashed line block has the same function and operation as the EIA described above with reference to FIG. 3. The transmission in the dashed line block on the right side indicates that the network node is required to, when successfully accessing into a channel on the unlicensed frequency band, perform uplink transmission after the EIA is completed. If the EIA detection fails, for example, the first broadcast signal cannot be detected or the energy of the first broadcast signal is not in the valid range, the system returns to the idle state. Further, if there is a new transmission request, the LBT process is performed again. In addition, similar to FIG. 3, after the CCA or the eCCA succeeds, whether an uplink grant-free scheduling mechanism is currently used may be determined in advance, as shown in a diamond dashed line block in FIG. 4. If it is determined that the uplink grant-free scheduling mechanism is currently used, the EIA in the dashed line block on the left is performed; otherwise the uplink transmission is directly performed after the timeslot boundaries are aligned.

It should be understood that the examples provided in FIGS. 3 and 4 are for illustrative purposes only and are not limitative. The EIA provided in present disclosure may be used in combination with any LBT mechanism as appropriate.

Figure 5:
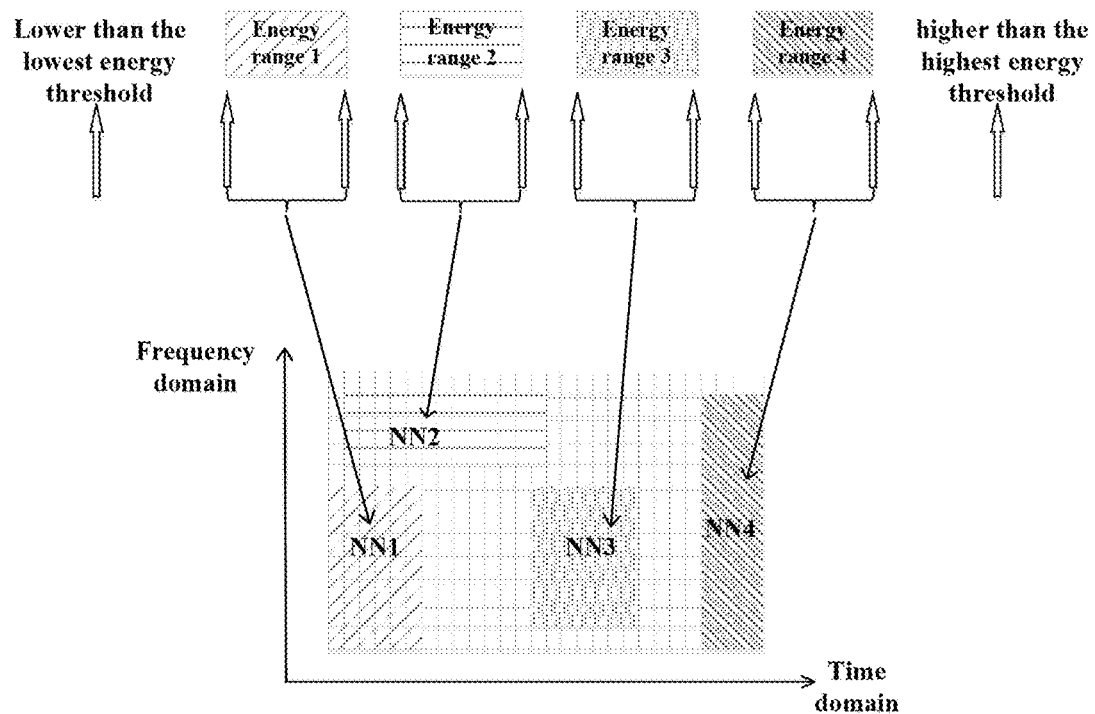
FIG. 5 is a diagram showing an example of correspondence between energy ranges and transmission resources.

As described above, after the CCA succeeds and the HA is performed, the determining unit 102 may determine the transmission resources based on the energy of the first broadcast signal. In this case, correspondence between the energy of the first broadcast signal and the transmission resources is established in advance. The correspondence may be included in, for example, an energy resource mapping table. The determining unit 102 may determine the transmission resources to be used based on the energy of the first broadcast signal by referring to a previously obtained energy resource mapping table. It should be understood that the energy resource mapping table typically includes correspondence between energy ranges and transmission resources due to the variability of the channel. As long as the determining unit 102 determines that the sensed energy of the first broadcast signal falls in a certain range, the network node may perform transmission using the transmission resources corresponding to the energy range. The transmission resources may be represented, for example, by an initial transmission resource and a resource size. FIG. 5 is a schematic diagram showing an example of correspondence between energy ranges and transmission resources, in which network nodes NN1 to NN4 respectively detect first broadcast signals in different energy ranges and find corresponding transmission resources according to those shown in FIG. 5. Furthermore, the network control terminal may cause a power of the first broadcast signal sensed by the network node to fall in a desired range by controlling the power of the transmitted first broadcast signal.

In addition, as shown in FIG. 5, in the case that the sensed energy of the first broadcast signal exceeds a certain range, for example, is less than a preset lowest energy threshold or greater than a highest energy threshold, it indicates that the network control terminal does not allocate the available uplink transmission resources to the network node due to factors such as the channel being busy or poor channel quality. In this case, the network node cannot communicate on the unlicensed frequency band.

There are two cases for the size of the allocated transmission resources. In a first case, the network node transmits an uplink scheduling request to the network control terminal (for example, via a licensed frequency band), the uplink scheduling request includes a size of the resources occupied by the transmissions to be performed by network node. In this case, the network control terminal plans a size of the transmission resources to be allocated to the network node based on the information. In a second case, the network node does not transmit an uplink scheduling request, and the network control terminal cannot obtain an actual demand of the network node. In this case, the network control terminal may perform allocation in a static uniform allocation manner or based on the history record.

In the above example, the determining unit 102 performs the EIA using the latency time period after the CCA succeeds in the LBT, to determine the transmission resources to be used, so as to achieve the uplink grant-free scheduling. Since the determining unit 102 is not required to repeatedly determine the sensed energy value of the first broadcast signal for multiple times, the time required for the EIA is short, which greatly decreases the latency compared with the case of using the uplink grant scheduling.

The energy resource mapping table is created by the network control terminal according to the distribution of the currently accessed network nodes, the interference conditions and the like, and is provided to the network node. As shown by the dashed line block in FIG. 1, the electronic apparatus 100 may further include: a transceiving unit 103 configured to receive an energy resource mapping table from a network control terminal. The transceiving unit 103 may receive the energy resource mapping table on the licensed frequency band.

Figure 6:
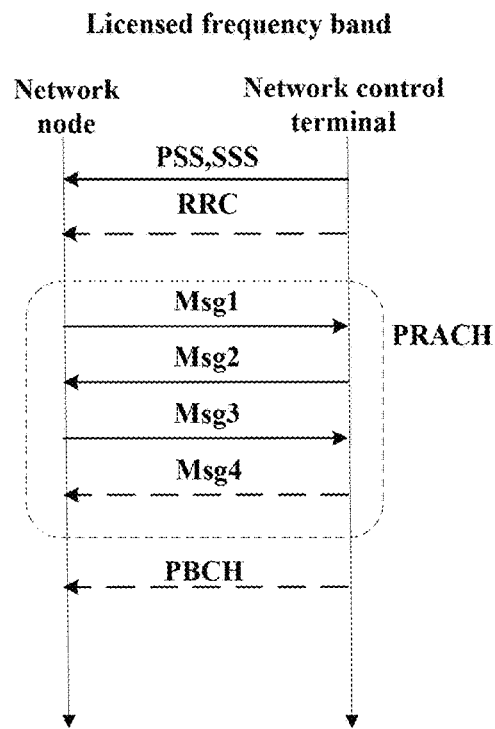
FIG. 6 is a schematic diagram showing signaling interaction on a licensed frequency band when a network node randomly accesses into an unlicensed frequency band in LAA.

For example, the transceiving unit 103 may receive the energy resource mapping table from the network control terminal when the network node randomly accesses into the unlicensed frequency band or after the network node randomly accesses into the unlicensed frequency band. FIG. 6 is a schematic diagram showing signaling interaction on a licensed frequency band when a network node randomly accesses into an unlicensed frequency band in LAA. The network control terminal, for example, the base station transmits PSS and SSS to the network node, for example, the user equipment, and performs random access, that is, performs an interaction of the Msg1 to the Msg4 on the Physical Random Access Channel (PRACH). As an example, the energy resource mapping table may be included in the Msg4. Alternatively, as shown in FIG. 6, the network control terminal may transmit the energy resource mapping table via Radio Resource Control (RRC) signaling after transmitting the PSS/SSS and before performing the random access on the PRACH. In addition, the network control terminal may transmit the energy resource mapping table, for example, by additionally transmitting a broadcast message on the Physical Broadcast Channel (PBCH) or via RRC signaling (not shown), after the random access is completed. Correspondingly, the transceiving unit 103 receives the energy resource mapping table through the broadcast or via the RRC signaling. Further, in a case that the energy resource mapping table is updated, the transceiving unit 103 may receive the updated energy resource mapping table via the RRC signaling or the broadcast message. The RRC signaling including the energy resource mapping table may also be transmitted before the PSS/SSS is transmitted, which is not shown in FIG. 6.

As described above, the determining unit 102 determines transmission resources corresponding to the energy of the sensed first broadcast signal based on the energy resource mapping table. Next, the network node performs uplink transmission using the transmission resources. After receiving the uplink transmitted data or control information, the network control terminal demodulates the same and transmits a feedback indicating whether the demodulation is successful to the network node. The feedback may be a cross-carrier feedback or a self-carrier feedback depending on the spectral band used for transmitting the feedback.

Figure 7:
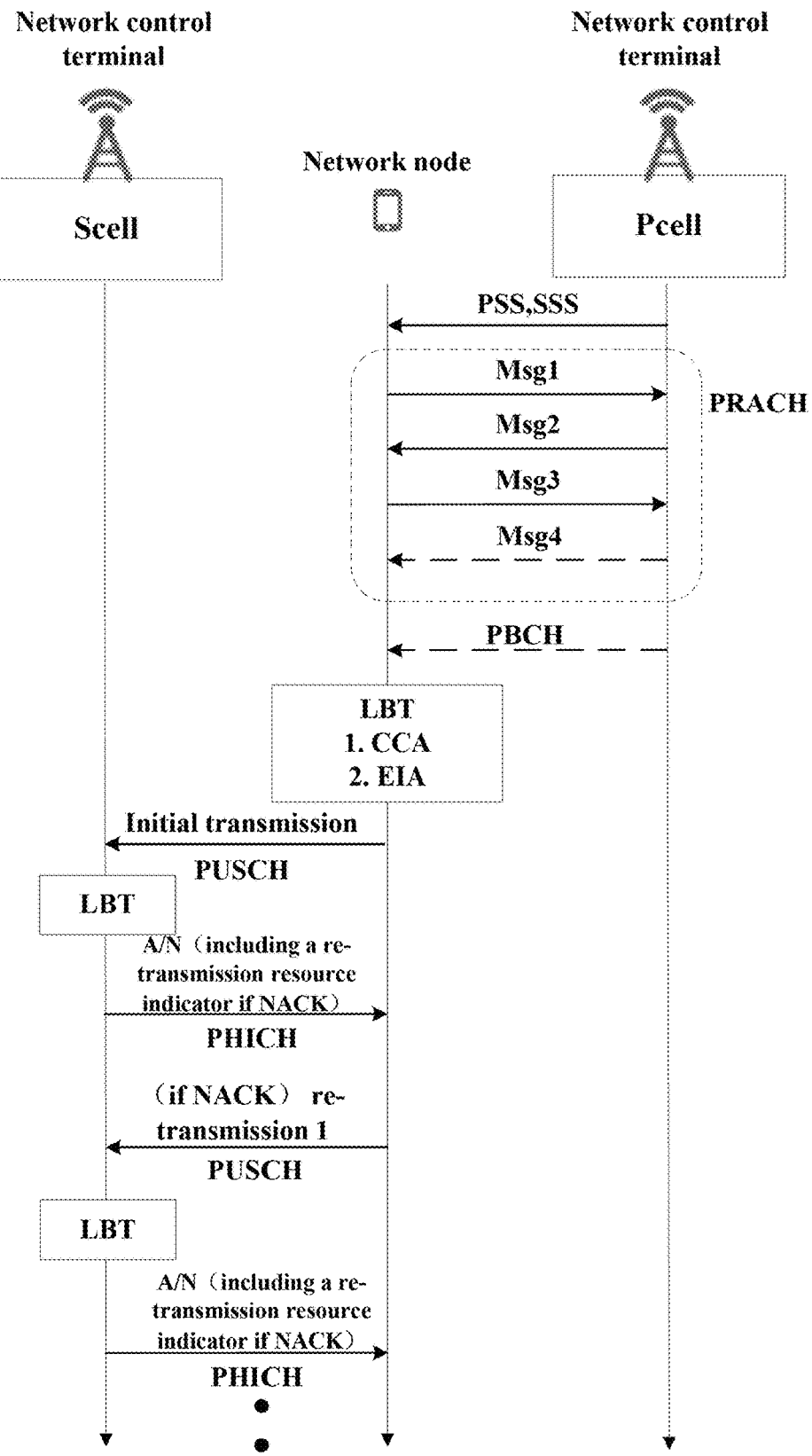
FIG. 7 is a schematic diagram showing an information procedure of self-carrier feedback.

The self-carrier feedback is first discussed, as shown in FIG. 7. The network control terminal may be divided into a primary cell (Pcell) and a secondary cell (Scell), according to functions of the network control terminal. The primary cell communicates with the network node on a licensed frequency band, and the secondary cell communicates with the network node on an unlicensed frequency band. The upper part of FIG. 7 shows signaling flow of the network node randomly accessing into a secondary cell under the LAA, which is similar to FIG. 6 and is not repeated herein.

After the network node randomly accesses into a secondary cell, since the network node is required to perform transmission, the LBT is performed. The LBT described herein includes not only the CCA but also the EIA performed after the CCA succeeds as described above, to determine the transmission resources to be used. The network node performs the transmission on the unlicensed frequency band using the determined transmission resources and receives the feedback from the network control terminal.

In the case of the self-carrier feedback, the transceiving unit 103 is configured to receive transmission feedback information about the unlicensed frequency band on the unlicensed frequency band. In the case of transmission failure, the transmission feedback information further includes re-transmission resource indicator. The determining unit 102 is configured to determine, when determining to perform re-transmission based on the transmission feedback information, transmission resources to be used by the re-transmission based on the re-transmission resource indicator.

For example, the network control terminal transmits an ACK message if the transmission succeeds, and transmits a NACK message if the transmission fails. These messages are all transmitted on the unlicensed frequency band in the case of the self-carrier feedback. It should be noted that, since the messages are transmitted on the unlicensed frequency band, the network control terminal is required to perform the LBT before transmitting the messages, to detect whether the current downlink channel is occupied.

In an example, the NACK message may further include a channel reservation signal for reserving a channel for the network node in the same Maximum Channel Occupancy Time (MCOT), so that the LBT is not required to be performed when performing the re-transmission. Especially in the case of poor channel conditions, multiple retransmissions can be avoided, thereby improving system efficiency. In addition, the network control terminal may further set an energy value of the channel reservation signal based on the energy resource mapping table, so that the determining unit 102 may determine the transmission resources to be used by the re-transmission based on the energy value of the channel reservation signal. In other words, the channel reservation signal is also used as the re-transmission resource indicator. In this case, when performing the re-transmission, the EIA is required to be performed first to determine the transmission resources to be used by the re-transmission, as shown by the dashed line block in FIG. 7.

In another example, a re-transmission resource allocation table is used as the re-transmission resource indicator to specify transmission resources to be used at the time of the re-transmission. The determining unit 102 determines the transmission resources to be used by the re-transmission based on the retransmission resource allocation table.

As shown in FIG. 7, the ACK/NACK message may be transmitted via a Physical Hybrid ARQ Indicator Channel (PHICH).

Next, the cross-carrier scheduling is discussed. In this case, the transceiving unit 103 is configured to receive transmission feedback information about the unlicensed frequency band on a licensed frequency band. When determining to perform re-transmission based on the transmission feedback information, the detecting unit 101 detects whether the unlicensed frequency band is idle. In the case of the unlicensed frequency band being idle, the determining unit 102 senses a first broadcast signal transmitted by the network control terminal, and determines transmission resources to be used by the re-transmission based on the first broadcast signal. The transmission feedback information may further include an updated energy resource mapping table.

Figure 8:
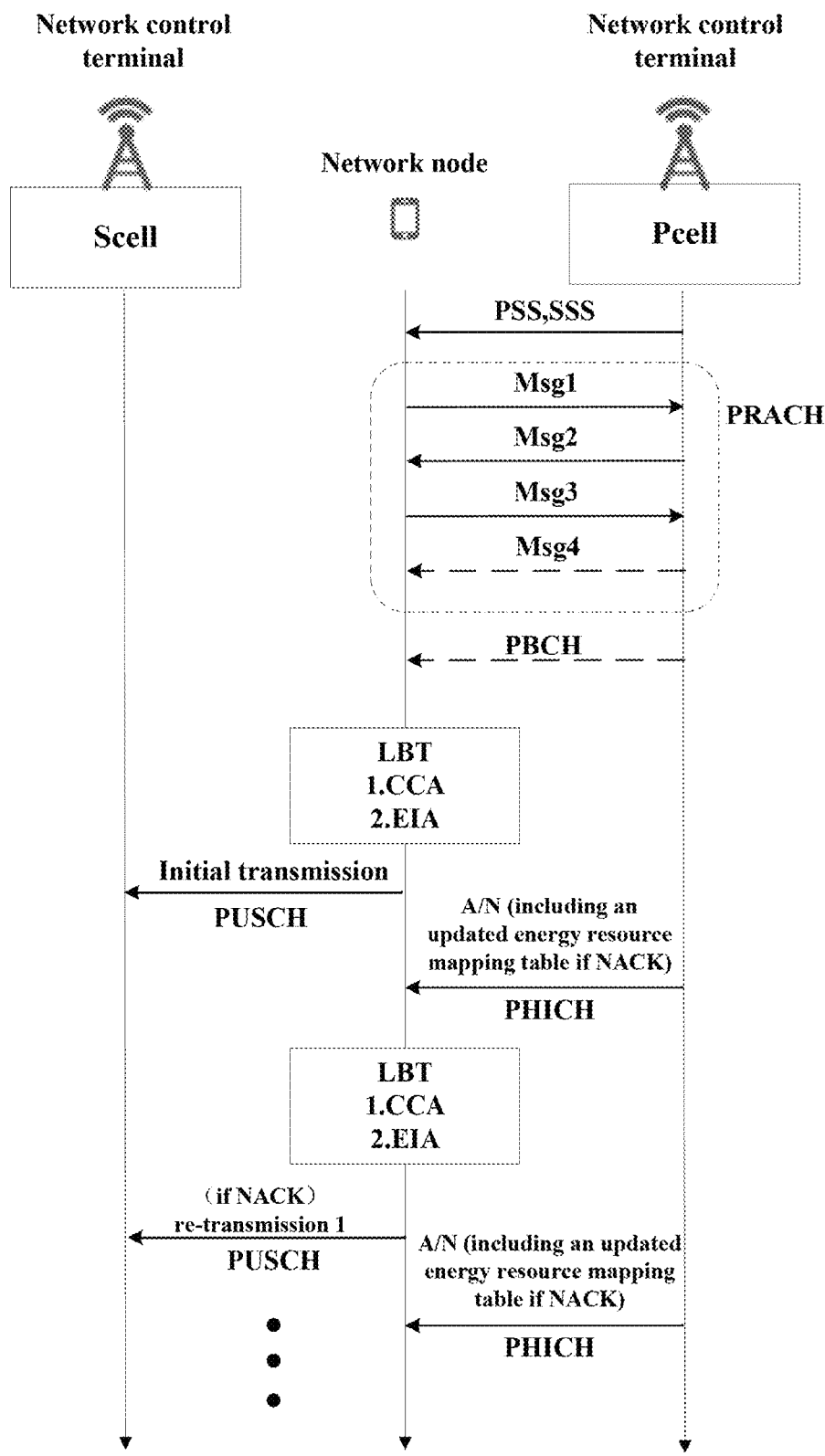
FIG. 8 is a schematic diagram showing an information procedure of cross-carrier feedback.

Similar to FIG. 7, FIG. 8 is a schematic diagram showing an information procedure for cross-carrier scheduling in which feedback information is transmitted on the licensed frequency band via the PHICH. The LBT including CCA and EIA is performed both before the initial transmission and before the re-transmission.

Figure 9:
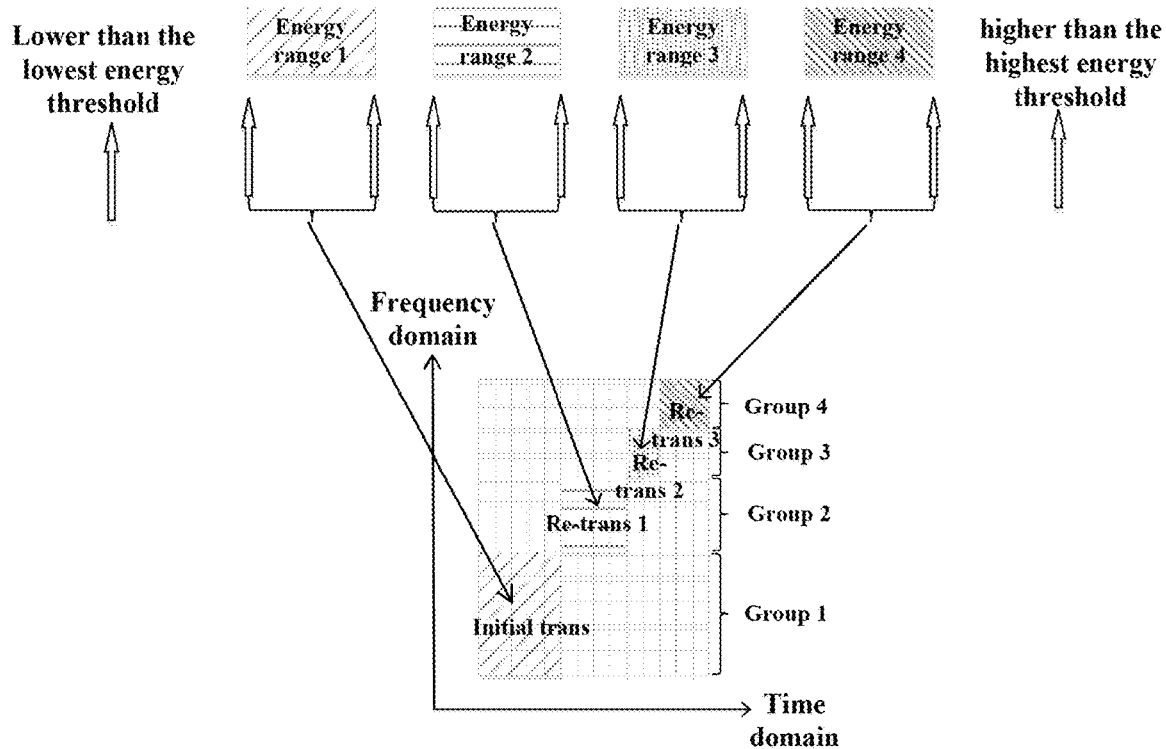
FIG. 9 is a schematic diagram showing an example of energy resource mapping for initial transmission and re-transmission.

In addition, as for a single network node, resource collisions may occur between the initial transmission and the possible re-transmission. For an adaptive HARQ, the base station transmits a re-transmission grant via the PDCCH, which includes a start position and a size of a time-frequency resource block selected for the re-transmission, so there is no conflict of resource selection between the re-transmission and the initial transmission. However, under the uplink grant-free scheduling mechanism, the network node cannot obtain the information about resource selection via explicit signaling, but determines to perform the uplink transmission on which block of resources allocated in advance by detecting the energy of the broadcast signal transmitted by the network control terminal. As shown in FIG. 9, in order to simplify the positional relationship between the energy and the allocated resource block, the entire resource block allocated to the network node may be divided into several groups such as four groups shown in the figure. The initial transmission and re-transmission at different times are positioned in different groups, so that the network control terminal may more directly acquire the uplink data information of the network node based on the resource range of the uplink transmission, so as to perform HARQ merge decoding.

In an example, the determining unit 102 may further be configured to switch to the uplink grant scheduling mechanism, in a case that the number of times of re-transmission increases, for example, in a case that the number of times of re-transmission exceeds a certain number (for example, three times), to ensure normal transmission. Specifically, the network control terminal may directly transmit an uplink scheduling license to the network node; or the network node transmits an uplink scheduling request to the network control terminal, and the network control terminal transmits the uplink scheduling grant based on the uplink scheduling request.

The above description is given for a single sub-carrier. For a scenario of multiple uplink sub-carriers such as uplink carrier aggregation, the detecting unit 101 and the determining unit 102 perform the above operation on each of multiple sub-carriers, respectively. In other words, the network node performs the LBT on each sub-carrier. In order to determine the allocation conditions of uplink resources, the EIA is required to be performed after the CCA is successfully completed. For example, the energy of the sensed first broadcast signals for different sub-carriers are the same, but the energy resource mapping tables for the different sub-carriers are different, for example, the frequency domain resources are different.

In summary, the electronic apparatus 100 provided in the present disclosure determines the uplink transmission resources that can be used by sensing the energy of the first broadcast signal, thereby implementing uplink grant-free scheduling, and thus simplifying signaling and reducing the transmission latency.

Second Embodiment

Figure 10:
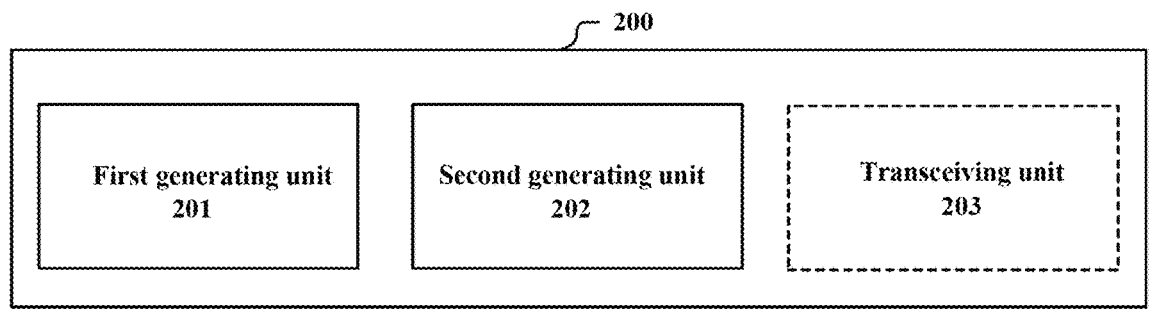
FIG. 10 is a block diagram showing functional modules of an electronic apparatus for wireless communications according to another embodiment of the present disclosure.

FIG. 10 is a block diagram showing functional modules of an electronic apparatus 200 for wireless communications according to another embodiment of the present disclosure. As shown in FIG. 10, the electronic apparatus 200 includes: a first generating unit 201, configured to generate, based on a distribution of network nodes, an energy resource mapping table which denotes correspondence between energy of a first broadcast signal received by a network node and transmission resources to be used on an unlicensed frequency band; and a second generation unit 202, configured to generate, based on the energy resource mapping table, the first broadcast signal with particular energy.

The first generating unit 201 and the second generating unit 202 may be implemented by, for example, one or more processing circuitries, which may be implemented as, for example, a chip.

The first generating unit 201 may calculate an energy loss of the transmitted signal at a certain distance based on the distribution of the currently accessed network nodes, for example, the number and the location of the network nodes, and the interference conditions or the like, to allocate the energy to be detected by different network nodes. As mentioned above, an energy range is usually set due to the uncertainty of the channel, and the energy range is corresponding to a certain part of the transmission resources. Different transmission resources may be allocated to different network nodes by distinguishing the energy range of the first broadcast signal received by the different network nodes, to avoid strong intra-frequency interferences between each other. For example, for a same network node, regardless of a change of its location, the second generating unit 202 may change the energy of the transmitted first broadcast signal based on its location change, to ensure that the energy of the first broadcast signal detected by the network node is within a same preset detection range. For example, if the network node is further away from the network control terminal or the interferences are enhanced, the transmission power of the first broadcast signal for the network node is correspondingly increased, and vice versa, the transmission power of the first broadcast signal is decreased.

The first generation unit 201 updates the energy resource mapping table when the distribution of the network nodes changes. For example, the allocated resources and energy mapping relationship of the accessed network nodes may be unchanged, and a new energy and resource mapping relationship may be added to the remaining available resources. Alternatively, the energy and resource mapping relationship may be re-allocated for all currently accessed network nodes. In this case, a new energy resource mapping table is required to be notified to the network nodes currently transmitting. Since the resources can be dynamically allocated based on the number of current network nodes, the effective utilization ratio of resources can be improved.

As shown by the dashed line block in FIG. 10, the electronic apparatus 200 may further include a transceiving unit 203, configured to transmit the energy resource mapping table to the network nodes and broadcast the first broadcast signal.

As an example, the transceiver unit 203 may transmit the first broadcast signal periodically or continuously. In this way, it is ensured that the network node can sense the first broadcast signal when necessary. As described in the first embodiment, the first broadcast signal may be transmitted on a licensed frequency band or on an unlicensed frequency band, but the timing sensed by the network node is different in the two above cases. For example, in the case that the first broadcast signal is transmitted on the unlicensed frequency band, the transceiving unit 203 may also broadcast the first broadcast signal in the case of the channel of the unlicensed frequency band being idle.

In addition, due to the variability of the wireless channel and insignificant differences between the energy ranges set for different network nodes, the energy value of the first broadcast signal sensed by the network node may be out of boundary. In order to decrease the probability that the sensed energy of signal is out of boundary as much as possible, the energy range may be discontinuously divided. That is, the energy range of the first broadcast signal that needs to be detected for different network nodes not only does not overlap at boundary values, but also the difference therebetween is much larger than any set of measurable energy ranges. Taking FIG. 5 as an example, for example, an energy range 1 may be set to [−95, −92] dBm, and an energy range 2 may be set to [−85, −82] dBm. If the measured energy value is still out of boundary in this case, the energy range may be determined by estimating a probability that the measured energy is closest to a certain energy range for multiple times. For example, if the network node measures that the energy of the first broadcast signal is −90 dBm, it can be estimated that the energy may belong to the energy range 1.

Based on the number of current network nodes and the number of network nodes spatially superimposed in a same direction, the network control terminal may broadcast the first broadcast signal omnidirectionally or in a specific beam direction. For example, the transceiving unit 203 may directionally broadcast the first broadcast signal. For example, the first broadcast signal is broadcast directionally in a direction of the best beam pair.

Taking communication between a base station and a UE as an example, a best beam pair is determined by beam-sweeping of the UE and the base station during synchronization on the licensed frequency band. This is because not only the base station may learn the best downlink beam, but also the user may learn the best uplink beam in the process of synchronization. The two beams are called as a beam pair. The broadcast signal transmitted by the base station by using the selected optimal beam pair has a concentrated direction and a minimum energy loss, so that the UE may only determine the energy value in the beam direction and ignore the received energy in other directions when performing energy detection, which greatly improves the accuracy of energy decision. FIG. 10 schematically shows the transmission of the first broadcast signal based on a beam pair. By transmitting in a specific beam direction, the problem of hidden nodes can be avoided to some extent, that is, the UE only detects the broadcast energy of the base station in a specific beam direction, thereby avoiding interferences of signals transmitted by other UEs.

In addition, the transceiving unit 203 may transmit the energy resource mapping table when the network node accesses into the unlicensed frequency band or after the network node accesses into the unlicensed frequency band. As shown in FIG. 6, the energy resource mapping table may be included in the Msg4 in the random access process. In addition, after the random access is completed, the transceiving unit 203 may transmit an energy resource mapping table by additionally transmitting a broadcast message on the PBCH or via RRC signaling. In a case that the energy resource mapping table is updated, the transceiving unit 203 may transmit the updated energy resource mapping table via the RRC signaling or the broadcast message. Furthermore, as shown in FIG. 8, the updated energy resource mapping table may also be included in a NACK message and is transmitted via the PHICH channel.

After receiving the uplink transmission from the network node, the network control terminal performs receiving operations such as demodulation, and feeds back the results of the receiving operations to the network node. For example, the network control terminal transmits an ACK message to the network node if the reception is successful, and the network control terminal transmits a NACK message to the network node if the reception is unsuccessful. In a case that the network node receives the NACK message, re-transmission may be performed. The second generating unit 202 generates the feedback, for example, based on a transmission result of the network node on the unlicensed frequency band. The feedback may be transmitted in two manners including self-carrier feedback and cross-carrier feedback, as shown in FIG. 7 and FIG. 8 respectively.

In the case of the self-carrier feedback, the network control terminal is required to first detect whether the unlicensed frequency band is idle, for example, perform the LBT, and the transceiving unit 203 transmits the feedback on the unlicensed frequency band in the case that the unlicensed frequency band is idle. The feedback further includes a re-transmission resource indicator in the case of the transmission failure.

In an example, the NACK message may further include a channel reservation signal for reserving a channel for the network node in the same Maximum Channel Occupancy Time (MOOT), so that the LBT is not required to be performed during the re-transmission. For example, an energy value of the channel reservation signal may be set based on the energy resource mapping table, so that the network node may determine the transmission resources to be used by the re-transmission based on the energy of the channel reservation signal. In other words, the channel reservation signal is also used as the re-transmission resource indicator.

In another example, a re-transmission resource allocation table is used as the re-transmission resource indicator to specify transmission resources to be used by the re-transmission. The network node determines the transmission resources to be used by the re-transmission based on the re-transmission resource allocation table.

As shown in FIG. 7, the ACK/NACK message may be transmitted via a Physical Hybrid ARQ Indicator Channel (PHICH).

In the case of the cross-carrier scheduling, the transceiving unit 203 is configured to transmit the feedback on a licensed frequency band. The feedback further includes an updated energy resource mapping table in the case of transmission failure. The feedback information is transmitted via the PHICH on the licensed band, as shown in FIG. 8. In this case, the licensed frequency band is in charge of information interaction, and the unlicensed frequency band is in charge of data interaction.

The above description is given for a single subcarrier. For a scenario of multiple sub-carriers (i.e., uplink carrier aggregation), the first generating circuit 201 is configured to generate an energy resource mapping table for each of the multiple sub-carriers. That is, the mapping relationships for different sub-carriers between the preset energy and the resource allocation are different, for example, the frequency domain resources are different.

In summary, the electronic apparatus 200 according to the present embodiment can implicitly allocate uplink transmission resources for the network node by establishing a mapping relationship between the first broadcast signal and the energy, thereby implementing uplink grant-free scheduling, and thus simplifying signaling and reducing the transmission latency.

Third Embodiment

Figure 11:
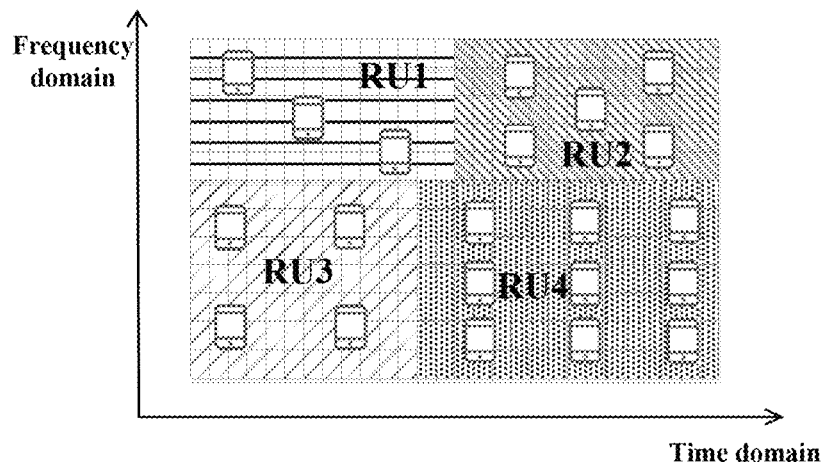
FIG. 11 is a schematic diagram showing contention resource units divided in time-frequency resources.

This embodiment is described with reference to the functional block diagram shown in FIG. 1. The determining unit 102 may determine the transmission resources based on a resource allocation rule preset by the network control terminal. For example, the network control terminal in advance divides several resource units (RUs) in available time-frequency resources, as shown in FIG. 11. The portions filled with different patterns respectively represent RU1 to RU4, and the RUs are orthogonal to each other. Each of the RUs may be dynamically allocated to multiple network nodes, the network nodes may select to multiplex this block of time-frequency resources in a non-orthogonal manner, and the network control terminal distinguishes different network nodes, for example, based on a pilot or signature unique to each network node.

Furthermore, the size of the RU may not be fixed, but be dynamically allocated by the network control terminal or be automatically adjusted by performing deep learning on the number of historical network nodes or the probability of collision between the network nodes. In this way, the characteristics of the unlicensed frequency band having a wide bandwidth may be fully utilized without explicit resource scheduling, and the spectrum efficiency can be improved by the adjustment of the RU size. For example, the RU having a larger number of accessed network nodes and low collision probability may be allocated with more resources, that is, the size of the RU is increased.

An example of the resource allocation rule is given above, which is not limitative, and any other suitable resource allocation rules may be adopted, such as an allocation rule based on the priority level of the network node.

A predetermined resource allocation rule may be notified to the accessed network nodes via the RRC signaling or by using a broadcast message. For example, the resource allocation rule may be transmitted to the network node when the network node randomly accesses into the unlicensed frequency band, for example, by using the Msg4 of the PRACH, or may be transmitted to the network node via the broadcast message or via the RRC signaling after the network node randomly accesses into the unlicensed frequency band. In the case of the LAA, the above resource allocation rule may be transmitted on a licensed frequency band. In addition, the resource allocation rule may also be transmitted on an unlicensed frequency band, as long as the network node can learn the resource allocation rule after performing the LBT and before performing the transmission.

In addition, as for a single network node, re-transmission may be required to be performed in the case of initial transmission failure. In order to avoid resource collisions that may occur between the initial transmission and the re-transmission, the transmission resources allocated for the network node may be further divided to cause the resources to be used for the initial transmission and the resources to be used for each re-transmission to be different. In this way, the determining unit 102 may determine the transmission resources to be used by the re-transmission based on the number of occurred re-transmissions. Moreover, since the resource ranges used by the initial transmission and the re-transmission are different, the network control terminal may determine the number of occurred re-transmissions according to the resource range, to more directly acquire the uplink data information of the network node, so as to perform HARQ merge decoding, thereby improving the success rate of HARQ decoding.

According to the above example, the network node may select the uplink transmission resources to be used according to a preset resource allocation rule without the licensed scheduling operation of the network control terminal, thereby reducing the latency.

An electronic apparatus for wireless communications is further provided in the present embodiment. The electronic apparatus includes a generating unit configured to generate a resource allocation rule. The resource allocation rule is provided to the network node, so that the network node performs selection of uplink transmission resources according to the resource allocation rule. A detailed description of the resource allocation rule has been described in detail hereinbefore and is not repeated herein.

Fourth Embodiment

In the process of describing the electronic apparatus in the embodiments described above, obviously, some processing and methods are also disclosed. Hereinafter, an overview of the methods is given without repeating some details disclosed above. However, it should be noted that, although the methods are disclosed in a process of describing the electronic apparatus, the methods do not certainly employ or are not certainly executed by the aforementioned components. For example, the embodiments of the electronic apparatus may be partially or completely implemented with hardware and/or firmware, the method described below may be executed by a computer-executable program completely, although the hardware and/or firmware of the electronic apparatus can also be used in the methods.

Figure 12:
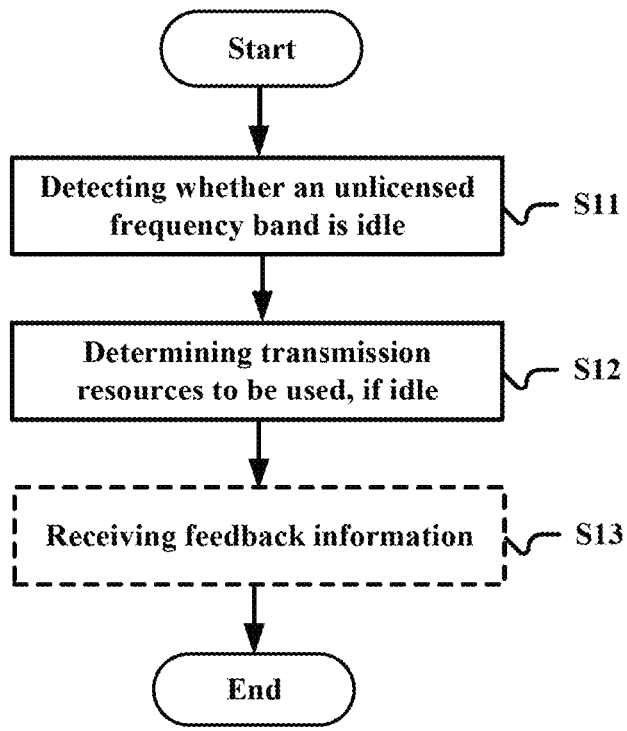
FIG. 12 is a flowchart showing a method for wireless communications according to an embodiment of the present disclosure.

FIG. 12 is a flowchart showing a method for wireless communications according to an embodiment of the present disclosure. The method includes: detecting whether an unlicensed frequency band is idle (S11); and determining transmission resources to be used on the unlicensed frequency band, in the case of detecting that the unlicensed frequency band is idle (S12).

In an example, in step S12, a first broadcast signal transmitted by a network control terminal is sensed, and the transmission resources are determined based on the first broadcast signal. For example, the transmission resource may be determined based on energy of the first broadcast signal by referring to an energy resource mapping table obtained in advance.

Although not shown in FIG. 12, the method may further include a step of receiving the energy resource mapping table from the network control terminal. This step may be performed when the network node randomly accesses into the unlicensed frequency band or after the network node randomly accesses into the unlicensed frequency band. For example, the energy resource mapping table may be received via radio resource control signaling or via broadcast.

In addition, as shown by the dashed line block in FIG. 12, the method may further include step S13 of receiving transmission feedback information about the unlicensed frequency band on the unlicensed frequency band, where the transmission feedback information further includes a re-transmission resource indicator in the case of transmission failure. For example, the re-transmission resource indicator may include a channel reservation signal, and the transmission resources to be used by the re-transmission may be determined based on energy value of the channel reservation signal.

When determining to perform re-transmission based on the transmission feedback information, transmission resources to be used by the re-transmission is determined based on the re-transmission resource indicator.

In addition, step S13 may be performed by steps including: receiving transmission feedback information about the unlicensed frequency band on a licensed frequency band, and when determining to perform re-transmission based on the transmission feedback information, detecting whether the unlicensed frequency band is idle; in the case of the unlicensed frequency band being idle, sensing a first broadcast signal transmitted by the network control terminal, and determining the transmission resources to be used by re-transmission based on the first broadcast signal. The transmission feedback information may further include an updated energy resource mapping table.

As another example, in step S12, the transmission resources are determined based on a resource allocation rule predetermined by the network control terminal. In addition, when performing the re-transmission, the transmission resources to be used by the re-transmission may be determined based on the number of the re-transmissions.

In the case of multiple sub-carriers, the operations in the above steps are performed on each of the multiple sub-carriers respectively.

Figure 13:
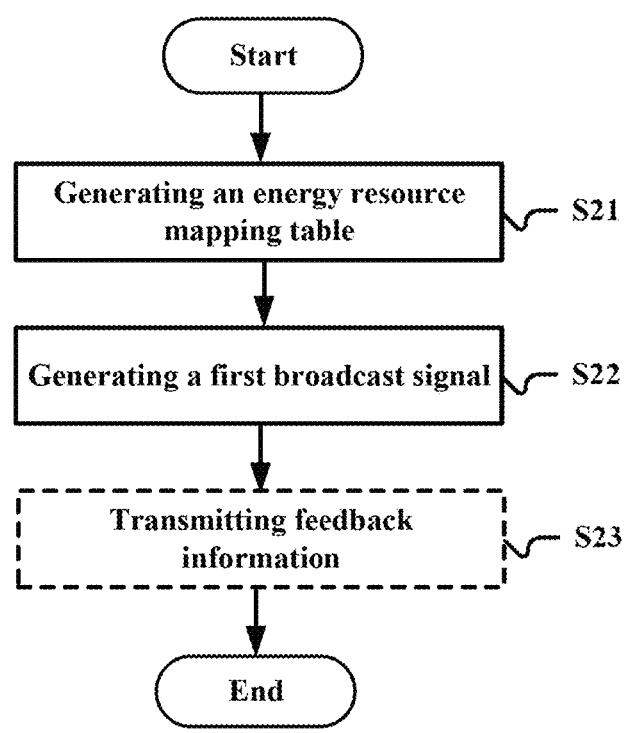
FIG. 13 is a flowchart showing a method for wireless communications according to another embodiment of the present disclosure.

FIG. 13 is a flowchart showing a method for wireless communications according to an embodiment of the present disclosure. The method includes: generating, based on a distribution of network nodes, an energy resource mapping table (S21), where the energy resource mapping table denotes correspondence between energy of a first broadcast signal received by a network node and transmission resources to be used on an unlicensed frequency band; and generating, based on the energy resource mapping table, the first broadcast signal with particular energy (S22).

In addition, in step S21, the energy resource mapping table is updated when the distribution of the network node changes.

Although not shown in figure, the above method may further include a step of transmitting the energy resource mapping table to the network node and broadcasting the first broadcast signal. For example, the first broadcast signal may be broadcasted omnidirectionally or directionally. Further, the first broadcast signal may be transmitted periodically or continuously.

In an example, the energy resource mapping table may be transmitted when the network node accesses into an unlicensed frequency band or after the network node accesses into an unlicensed frequency band. For example, the energy resource mapping table may be transmitted via radio resource control signaling or via broadcast.

In addition, the network control terminal generates a feedback based on a transmission result of the network node on the unlicensed frequency band. As shown by the dashed line block in FIG. 13, the method further includes step S23 of transmitting a feedback message to the network node. Step S23 may be performed on an unlicensed frequency band. First, it is detected whether the unlicensed frequency band is idle, and the feedback is transmitted in a case that the unlicensed frequency band is idle. The feedback further includes a re-transmission resource indicator in the case of transmission failure. For example, the re-transmission resource indicator includes a channel reservation signal, and energy value of the channel reservation signal is used to determine the transmission resources to be used by the network node for the re-transmission.

Step S23 may also be performed on the licensed frequency band, and the feedback may further include an updated energy resource mapping table in the case of transmission failure.

The above description is given for a single sub-carrier. In the case of multiple sub-carriers, an energy resource mapping table is generated for each of the multiple sub-carriers.

It should be noted that, the above methods can be performed separately or in combination with each other, and the details thereof are described in the first to the third embodiments, which are not repeatedly described herein.

In summary, with the electronic apparatus and the method in the present disclosure, the uplink grant-free scheduling can be implemented, thereby simplify the signaling and reducing the latency.

Application Example

The technology of the present disclosure is applicable to various products. For example, the above mentioned base station may be realized as any type of evolved Node B (eNB) such as a macro eNB and a small eNB. The small eNB such as a pico eNB, micro eNB and a home (femto-cell) eNB may have a smaller coverage range than a macro cell. Alternatively, the base station may also be implemented as any other type of base stations, such as a NodeB and a base transceiver station (BTS). The base station may include a body (also referred to as a base station device) configured to control wireless communications; and one or more remote radio heads (RRHs) arranged in a different position from the body. In addition, various types of user equipments, which will be described below, may each operate as the base station by temporarily or semi-persistently executing a base station function.

[Application Example Regarding Base Station]

First Application Example

Figure 14:
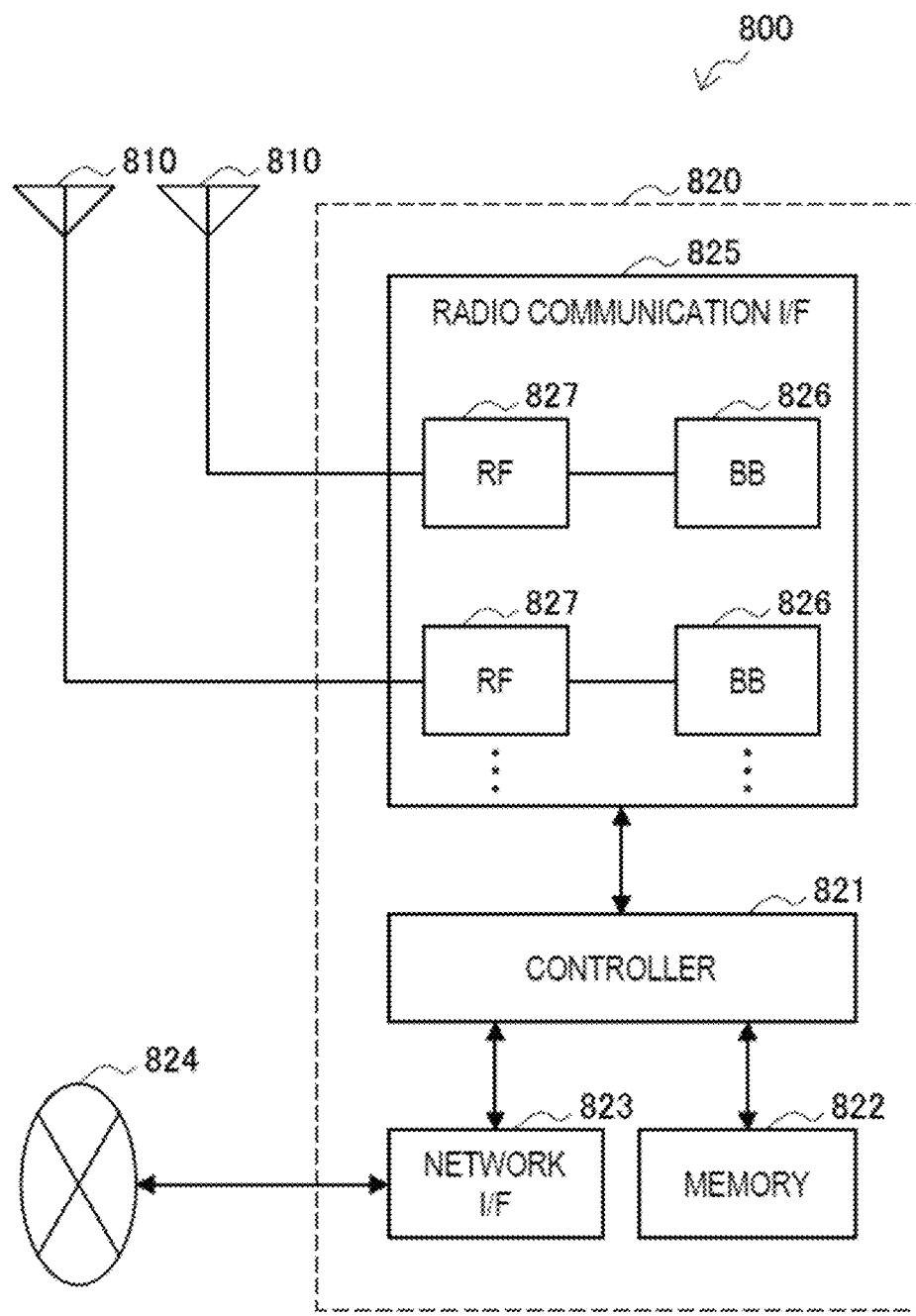
FIG. 14 is a block diagram illustrating a first example of a schematic configuration of an eNB to which the technology of the present disclosure may be applied.

FIG. 14 is a block diagram illustrating a first example of a schematic configuration of an eNB to which the technology of the present disclosure may be applied. An eNB 800 includes one or more antennas 810 and a base station apparatus 820. The base station apparatus 820 and each of the antennas 810 may be connected to each other via a radio frequency (RF) cable.

Figure 17:
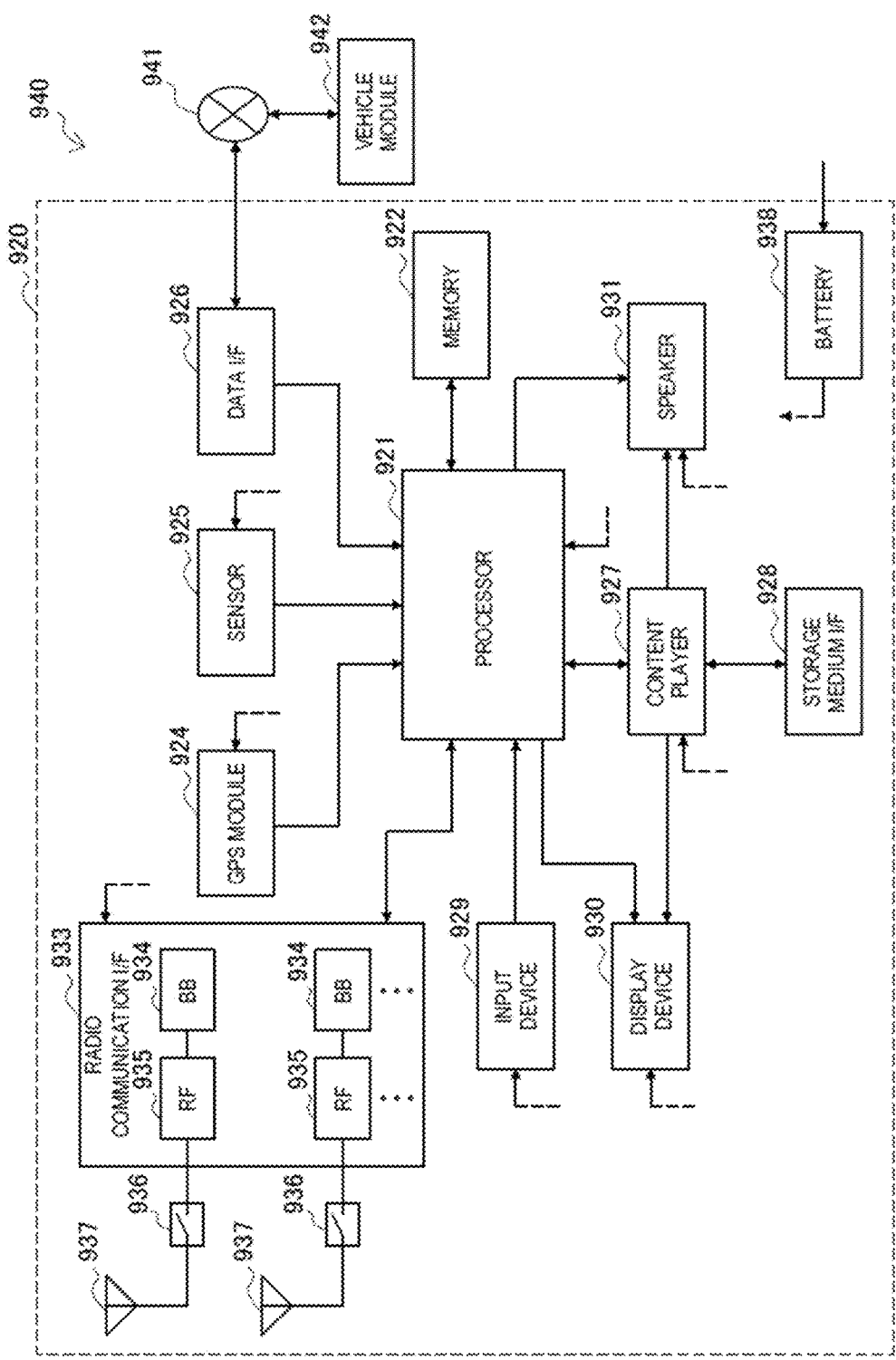
FIG. 17 is a block diagram illustrating an example of a schematic configuration of an car navigation device to which the technology of the present disclosure may be applied.

Each of the antennas 810 includes a single or multiple antennal elements (such as multiple antenna elements included in a multiple-input multiple-output (MIMO) antenna), and is used for the base station apparatus 820 to transmit and receive wireless signals. As shown in FIG. 17, the eNB 800 may include the multiple antennas 810. For example, the multiple antennas 810 may be compatible with multiple frequency bands used by the eNB 800. Although FIG. 14 shows the example in which the eNB 800 includes the multiple antennas 810, the eNB 800 may also include a single antenna 810.

The base station apparatus 820 includes a controller 821, a memory 822, a network interface 823, and a radio communication interface 825.

The controller 821 may be, for example, a CPU or a DSP, and operates various functions of a higher layer of the base station apparatus 820. For example, the controller 821 generates a data packet from data in signals processed by the radio communication interface 825, and transfers the generated packet via the network interface 823. The controller 821 may bundle data from multiple base band processors to generate the bundled packet, and transfer the generated bundled packet. The controller 821 may have logical functions of performing control such as radio resource control, radio bearer control, mobility management, admission control and scheduling. The control may be performed in corporation with an eNB or a core network node in the vicinity. The memory 822 includes a RAM and a ROM, and stores a program executed by the controller 821 and various types of control data (such as terminal list, transmission power data and scheduling data).

The network interface 823 is a communication interface for connecting the base station apparatus 820 to a core network 824. The controller 821 may communicate with a core network node or another eNB via the network interface 823. In this case, the eNB 800, and the core network node or another eNB may be connected to each other via a logic interface (such as an Si interface and an X2 interface). The network interface 823 may also be a wired communication interface or a wireless communication interface for wireless backhaul. If the network interface 823 is a wireless communication interface, the network interface 823 may use a higher frequency band for wireless communication than that used by the radio communication interface 825.

The radio communication interface 825 supports any cellular communication scheme (such as Long Term Evolution (LTE) and LTE-advanced), and provides wireless connection to a terminal located in a cell of the eNB 800 via the antenna 810. The radio communication interface 825 may typically include, for example, a baseband (BB) processor 826 and an RF circuit 827. The BB processor 826 may perform, for example, encoding/decoding, modulating/demodulating, and multiplexing/demultiplexing, and performs various types of signal processing of layers (such as L1, Media Access Control (MAC), Radio Link Control (RLC), and a Packet Data Convergence Protocol (PDCP)). The BB processor 826 may have a part or all of the above-described logical functions instead of the controller 821. The BB processor 826 may be a memory storing communication control programs, or a module including a processor and a related circuit configured to execute the programs. Updating the program may allow the functions of the BB processor 826 to be changed. The module may be a card or a blade that is inserted into a slot of the base station apparatus 820. Alternatively, the module may also be a chip that is mounted on the card or the blade. Meanwhile, the RF circuit 827 may include, for example, a mixer, a filter, and an amplifier, and transmits and receives wireless signals via the antenna 810.

As show in FIG. 14, the radio communication interface 825 may include the multiple BB processors 826. For example, the multiple BB processors 826 may be compatible with multiple frequency bands used by the eNB 800. The radio communication interface 825 may include multiple RF circuits 827, as shown in FIG. 14. For example, the multiple RF circuits 827 may be compatible with multiple antenna elements. Although FIG. 14 shows the example in which the radio communication interface 825 includes the multiple BB processors 826 and the multiple RF circuits 827, the radio communication interface 825 may also include a single BB processor 826 and a single RF circuit 827.

In the eNB 800 shown in FIG. 14, the transceiving unit 203 described with reference to FIG. 10 may be implemented by the radio communication interface 825. At least part of the functions may be implemented by the controller 821. For example, the controller 821 may generate the energy resource mapping table and the first broadcast signal by performing functions of the first generating unit 201 and the second generating unit 202.

Second Application Example

Figure 15:
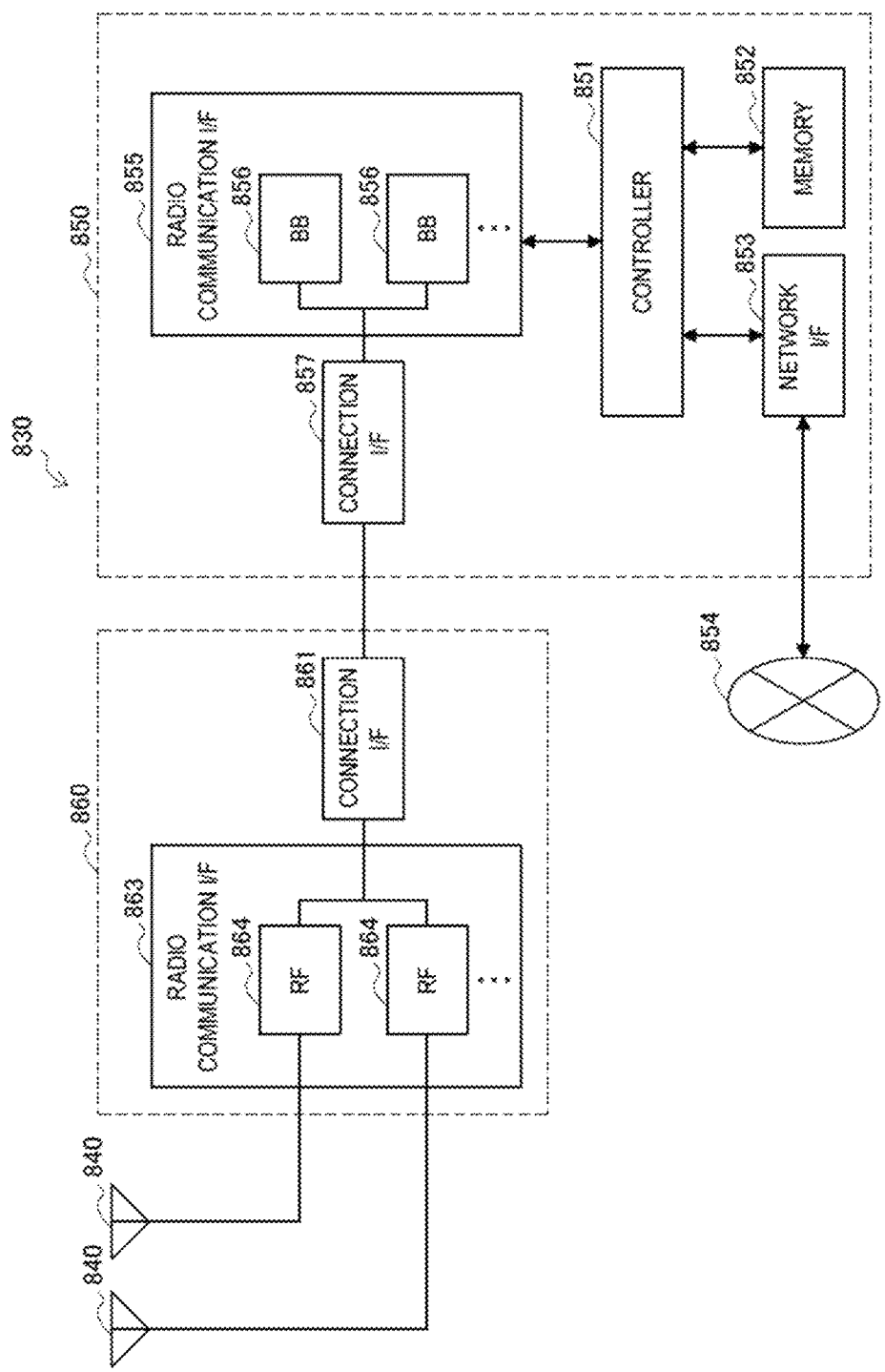
FIG. 15 is a block diagram illustrating a second example of a schematic configuration of an eNB to which the technology of the present disclosure may be applied.

FIG. 15 is a block diagram illustrating a second example of a schematic configuration of an eNB to which the technology of the present disclosure may be applied. An eNB 830 includes one or more antennas 840, a base station apparatus 850, and an RRH 860. The RRH 860 and each of the antennas 840 may be connected to each other via an RF cable. The base station apparatus 850 and the RRH 860 may be connected to each other via a high speed line such as an optical fiber cable.

Each of the antennas 840 includes a single or multiple antennal elements (such as multiple antenna elements included in an MIMO antenna), and is used for the RRH 860 to transmit and receive wireless signals. As shown in FIG. 15, the eNB 830 may include the multiple antennas 840. For example, the multiple antennas 840 may be compatible with multiple frequency bands used by the eNB 830. Although FIG. 15 shows the example in which the eNB 830 includes the multiple antennas 840, the eNB 830 may also include a single antenna 840.

The base station apparatus 850 includes a controller 851, a memory 852, a network interface 853, a radio communication interface 855, and a connection interface 857. The controller 851, the memory 852, and the network interface 853 are the same as the controller 821, the memory 822, and the network interface 823 described with reference to FIG. 24.

The radio communication interface 855 supports any cellular communication scheme (such as LTE and LTE-advanced), and provides wireless communication to a terminal located in a sector corresponding to the RRH 860 via the RRH 860 and the antenna 840. The radio communication interface 855 may typically include, for example, a BB processor 856. The BB processor 856 is the same as the BB processor 826 described with reference to FIG. 15, except that the BB processor 856 is connected to an RF circuit 864 of the RRH 860 via the connection interface 857. As show in FIG. 15, the radio communication interface 855 may include the multiple BB processors 856. For example, the multiple BB processors 856 may be compatible with multiple frequency bands used by the eNB 830. Although FIG. 15 shows the example in which the radio communication interface 855 includes the multiple BB processors 856, the radio communication interface 855 may also include a single BB processor 856.

The connection interface 857 is an interface for connecting the base station apparatus 850 (radio communication interface 855) to the RRH 860. The connection interface 857 may also be a communication module for communication in the above-described high speed line that connects the base station apparatus 850 (radio communication interface 855) to the RRH 860.

The RRH 860 includes a connection interface 861 and a radio communication interface 863.

The connection interface 861 is an interface for connecting the RRH 860 (radio communication interface 863) to the base station apparatus 850. The connection interface 861 may also be a communication module for communication in the above-described high speed line.

The radio communication interface 863 transmits and receives wireless signals via the antenna 840. The radio communication interface 863 may typically include, for example, the RF circuit 864. The RF circuit 864 may include, for example, a mixer, a filter and an amplifier, and transmits and receives wireless signals via the antenna 840. The radio communication interface 863 may include multiple RF circuits 864, as shown in FIG. 15. For example, the multiple RF circuits 864 may support multiple antenna elements. Although FIG. 15 shows the example in which the radio communication interface 863 includes the multiple RF circuits 864, the radio communication interface 863 may also include a single RF circuit 864.

In the eNB 830 shown in FIG. 15, the transceiving unit 203 described with reference to FIG. 10 may be implemented by the radio communication interface 855 and/or the radio communication interface 863. At least a part of the functions may be implemented by the controller 851. For example, the controller 851 may generate the energy resource mapping table and the first broadcast signal by performing functions of the first generating unit 201 and the second generating unit 202.

[Application Example Regarding User Equipment]

First Application Example

Figure 16:
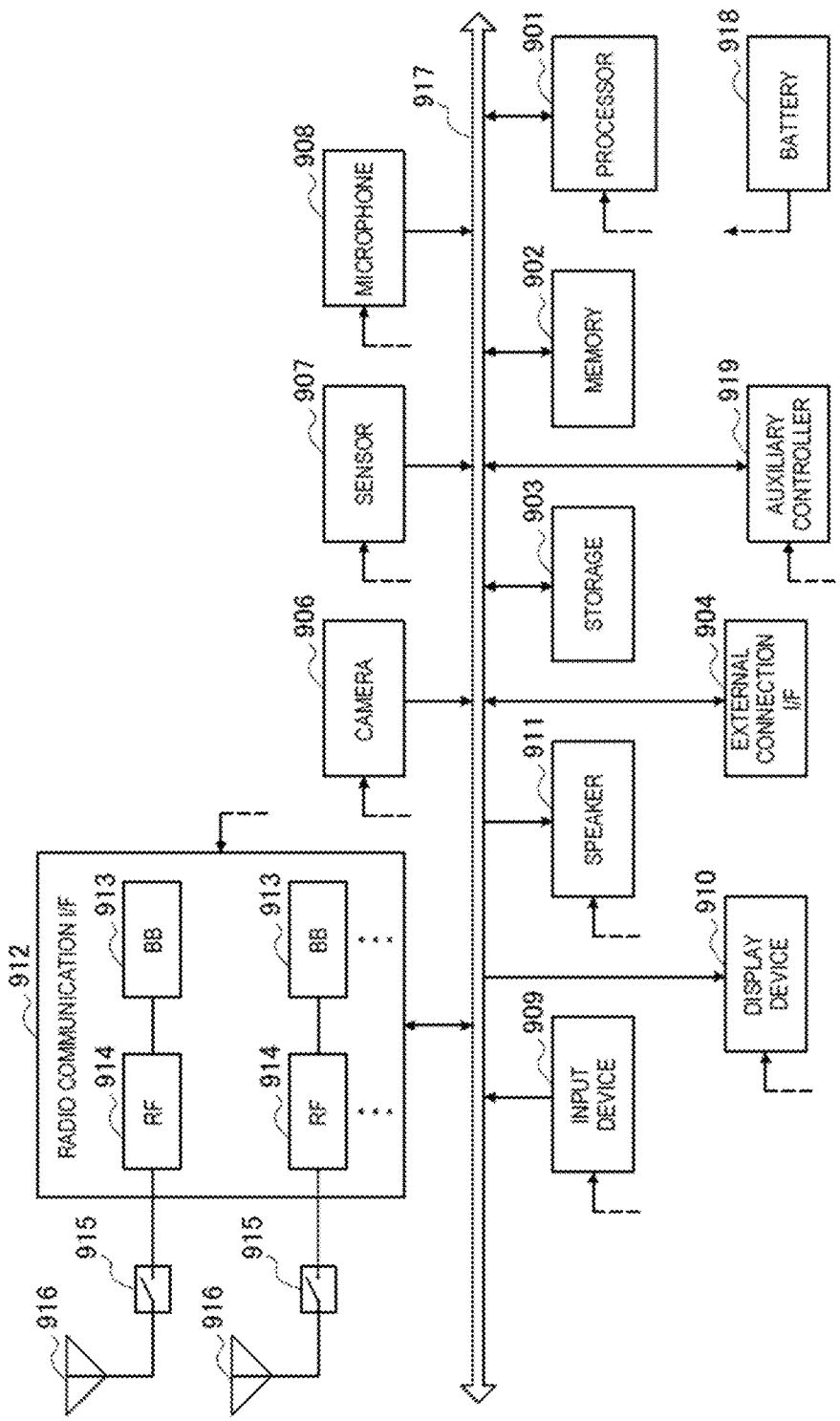
FIG. 16 is a block diagram illustrating an example of a schematic configuration of a smart phone to which the technology of the present disclosure may be applied.

FIG. 16 is a block diagram illustrating an example of a schematic configuration of a smartphone 900 to which the technology of the present disclosure may be applied. The smart phone 900 includes a processor 901, a memory 902, a storage 903, an external connection interface 904, a camera 906, a sensor 907, a microphone 908, an input device 909, a display device 910, a speaker 911, a radio communication interface 912, one or more antenna switches 915, one or more antennas 916, a bus 917, a battery 918, and an auxiliary controller 919.

The processor 901 may be, for example, a CPU or a system on a chip (SoC), and controls functions of an application layer and another layer of the smart phone 900. The memory 902 includes a RAM and a ROM, and stores a program executed by the processor 901 and data. The storage 903 may include a storage medium such as a semiconductor memory and a hard disk. The external connection interface 904 is an interface for connecting an external device (such as a memory card and a universal serial bus (USB) device) to the smart phone 900.

The camera 906 includes an image sensor (such as a charge coupled device (CCD) and a complementary metal oxide semiconductor (CMOS)), and generates a captured image. The sensor 907 may include a group of sensors, such as a measurement sensor, a gyro sensor, a geomagnetism sensor, and an acceleration sensor. The microphone 908 converts sounds that are inputted to the smart phone 900 to audio signals. The input device 909 includes, for example, a touch sensor configured to detect touch onto a screen of the display device 910, a keypad, a keyboard, a button, or a switch, and receives an operation or an information inputted from a user. The display device 910 includes a screen (such as a liquid crystal display (LCD) and an organic light-emitting diode (OLED) display), and displays an output image of the smart phone 900. The speaker 911 converts audio signals that are outputted from the smart phone 900 to sounds.

The radio communication interface 912 supports any cellular communication scheme (such as LTE and LTE-advanced), and performs a wireless communication. The radio communication interface 912 may include, for example, a BB processor 913 and an RF circuit 914. The BB processor 913 may perform, for example, encoding/decoding, modulating/demodulating, and multiplexing/de-multiplexing, and perform various types of signal processing for wireless communication. The RF circuit 914 may include, for example, a mixer, a filter and an amplifier, and transmits and receives wireless signals via the antenna 916. It should be noted that although FIG. 16 shows a case where one RF link is connected to one antenna, which is only illustrative and a case where one RF link is connected to multiple antennas through multiple phase shifters may exist. The radio communication interface 912 may be a chip module having the BB processor 913 and the RF circuit 914 integrated thereon. The radio communication interface 912 may include multiple BB processors 913 and multiple RF circuits 914, as shown in FIG. 16. Although FIG. 16 shows the example in which the radio communication interface 912 includes the multiple BB processors 913 and the multiple RF circuits 914, the radio communication interface 912 may also include a single BB processor 913 or a single RF circuit 914.

Furthermore, in addition to a cellular communication scheme, the radio communication interface 912 may support another type of wireless communication scheme such as a short-distance wireless communication scheme, a near field communication scheme, and a radio local area network (LAN) scheme. In this case, the radio communication interface 912 may include the BB processor 913 and the RF circuit 914 for each wireless communication scheme.

Each of the antenna switches 915 switches connection destinations of the antennas 916 among multiple circuits (such as circuits for different wireless communication schemes) included in the radio communication interface 912.

Each of the antennas 916 includes a single or multiple antenna elements (such as multiple antenna elements included in an MIMO antenna) and is used for the radio communication interface 912 to transmit and receive wireless signals. The smart phone 900 may include the multiple antennas 916, as shown in FIG. 16. Although FIG. 16 shows the example in which the smart phone 900 includes the multiple antennas 916, the smart phone 900 may also include a single antenna 916.

Furthermore, the smart phone 900 may include the antenna 916 for each wireless communication scheme. In this case, the antenna switches 915 may be omitted from the configuration of the smart phone 900.

The bus 917 connects the processor 901, the memory 902, the storage 903, the external connection interface 904, the camera 906, the sensor 907, the microphone 908, the input device 909, the display device 910, the speaker 911, the radio communication interface 912, and the auxiliary controller 919 to each other. The battery 918 supplies power to blocks of the smart phone 900 shown in FIG. 16 via feeder lines that are partially shown as dashed lines in FIG. 16. The auxiliary controller 919, operates a minimum necessary function of the smart phone 900, for example, in a sleep mode.

In the smart phone 900 shown in FIG. 16, the transceiving unit 103 described with reference to FIG. 1 may be implemented by the radio communication interface 912. At least a part of functions may be implemented by the processor 901 or the auxiliary controller 919. For example, the processor 901 or the auxiliary controller 919 may determine the transmission resources to be used on the unlicensed frequency band in a manner of the uplink grant-free scheduling, by performing the functions of the detecting unit 101 and the determining unit 102.

Second Application Example

FIG. 17 is a block diagram illustrating an example of a schematic configuration of a car navigation apparatus 920 to which the technology of the present disclosure may be applied. The car navigation apparatus 920 includes a processor 921, a memory 922, a global positioning system (GPS) module 924, a sensor 925, a data interface 926, a content player 927, a storage medium interface 928, an input device 929, a display device 930, a speaker 931, a radio communication interface 933, one or more antenna switches 936, one or more antennas 937, and a battery 938.

The processor 921 may be, for example a CPU or a SoC, and controls a navigation function and additional function of the car navigation apparatus 920. The memory 922 includes RAM and ROM, and stores a program that is executed by the processor 921, and data.

The GPS module 924 determines a position (such as latitude, longitude and altitude) of the car navigation apparatus 920 by using GPS signals received from a GPS satellite. The sensor 925 may include a group of sensors such as a gyro sensor, a geomagnetic sensor and an air pressure sensor. The data interface 926 is connected to, for example, an in-vehicle network 941 via a terminal that is not shown, and acquires data (such as vehicle speed data) generated by the vehicle.

The content player 927 reproduces content stored in a storage medium (such as a CD and a DVD) that is inserted into the storage medium interface 928. The input device 929 includes, for example, a touch sensor configured to detect touch onto a screen of the display device 930, a button, or a switch, and receives an operation or information inputted from a user. The display device 930 includes a screen such as an LCD or OLED display, and displays an image of the navigation function or content that is reproduced. The speaker 931 outputs a sounds for the navigation function or the content that is reproduced.

The radio communication interface 933 supports any cellular communication scheme (such as LTE and LTE-Advanced), and performs wireless communication. The radio communication interface 933 may typically include, for example, a BB processor 934 and an RF circuit 935. The BB processor 934 may perform, for example, encoding/decoding, modulating/demodulating and multiplexing/demultiplexing, and perform various types of signal processing for wireless communication. The RF circuit 935 may include, for example, a mixer, a filter and an amplifier, and transmits and receives wireless signals via the antenna 937. The radio communication interface 933 may also be a chip module having the BB processor 934 and the RF circuit 935 integrated thereon. The radio communication interface 933 may include multiple BB processors 934 and multiple RF circuits 935, as shown in FIG. 17. Although FIG. 17 shows the example in which the radio communication interface 933 includes the multiple BB processors 934 and the multiple RF circuits 935, the radio communication interface 933 may also include a single BB processor 934 and a single RF circuit 935.

Furthermore, in addition to a cellular communication scheme, the radio communication interface 933 may support another type of wireless communication scheme such as a short-distance wireless communication scheme, a near field communication scheme, and a wireless LAN scheme. In this case, the radio communication interface 933 may include the BB processor 934 and the RF circuit 935 for each wireless communication scheme.

Each of the antenna switches 936 switches connection destinations of the antennas 937 among multiple circuits (such as circuits for different wireless communication schemes) included in the radio communication interface 933.

Each of the antennas 937 includes a single or multiple antenna elements (such as multiple antenna elements included in an MIMO antenna), and is used by the radio communication interface 933 to transmit and receive wireless signals. As shown in FIG. 17, the car navigation apparatus 920 may include the multiple antennas 937. Although FIG. 17 shows the example in which the car navigation apparatus 920 includes the multiple antennas 937, the car navigation apparatus 920 may also include a single antenna 937.

Furthermore, the car navigation apparatus 920 may include the antenna 937 for each wireless communication scheme. In this case, the antenna switches 936 may be omitted from the configuration of the car navigation apparatus 920.

The battery 938 supplies power to the blocks of the car navigation apparatus 920 shown in FIG. 17 via feeder lines that are partially shown as dash lines in FIG. 17. The battery 938 accumulates power supplied from the vehicle.

In the car navigation apparatus 920 shown in FIG. 17, the transceiving unit 103 described with reference to FIG. 1 may be implemented by the radio communication interface 933. At least a part of functions may be implemented by the processor 921. For example, the processor 921 may determine the transmission resources to be used on the unlicensed frequency band in a manner of the uplink grant-free scheduling, by performing the functions of the detecting unit 101 and the determining unit 102.

The technology of the present disclosure may also be implemented as an in-vehicle system (or a vehicle) 940 including one or more blocks of the car navigation apparatus 920, the in-vehicle network 941 and a vehicle module 942. The vehicle module 942 generates vehicle data (such as a vehicle speed, an engine speed, and failure information), and outputs the generated data to the in-vehicle network 941.

The basic principle of the present disclosure has been described above in conjunction with particular embodiments. However, as can be appreciated by those ordinarily skilled in the art, all or any of the steps or components of the method and apparatus according to the disclosure can be implemented with hardware, firmware, software or a combination thereof in any computing device (including a processor, a storage medium, etc.) or a network of computing devices by those ordinarily skilled in the art in light of the disclosure of the disclosure and making use of their general circuit designing knowledge or general programming skills.

Moreover, the present disclosure further discloses a program product in which machine-readable instruction codes are stored. The aforementioned methods according to the embodiments can be implemented when the instruction codes are read and executed by a machine.

Accordingly, a memory medium for carrying the program product in which machine-readable instruction codes are stored is also covered in the present disclosure. The memory medium includes but is not limited to soft disc, optical disc, magnetic optical disc, memory card, memory stick and the like.

In the case where the present disclosure is realized with software or firmware, a program constituting the software is installed in a computer with a dedicated hardware structure (e.g. the general computer 1800 shown in FIG. 18) from a storage medium or network, wherein the computer is capable of implementing various functions when installed with various programs.

Figure 18:
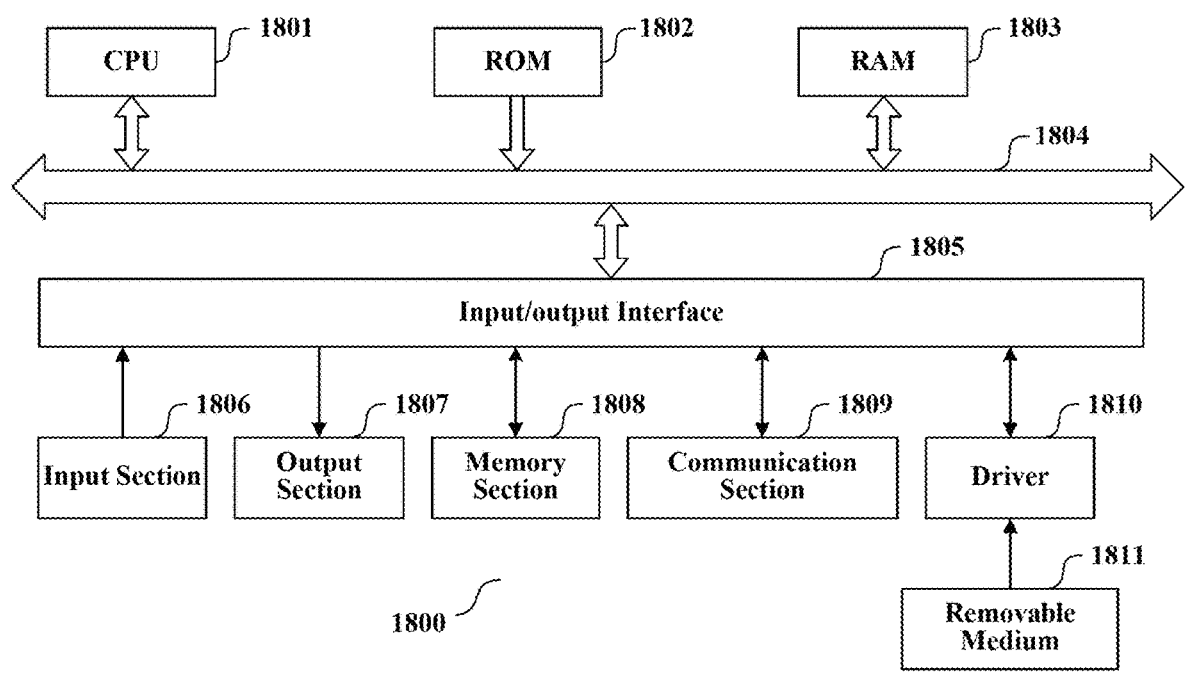
FIG. 18 is a block diagram of an exemplary block diagram illustrating the structure of a general purpose personal computer capable of realizing the method and/or device and/or system according to the embodiments of the present invention.

In FIG. 18, a central processing unit (CPU) 1801 executes various processing according to a program stored in a read-only memory (ROM) 1802 or a program loaded to a random access memory (RAM) 1803 from a memory section 1808. The data needed for the various processing of the CPU 1801 may be stored in the RAM 1803 as needed. The CPU 1801, the ROM 1802 and the RAM 1803 are linked with each other via a bus 1804. An input/output interface 1805 is also linked to the bus 1804.

The following components are linked to the input/output interface 1805: an input section 1806 (including keyboard, mouse and the like), an output section 1807 (including displays such as a cathode ray tube (CRT), a liquid crystal display (LCD), a loudspeaker and the like), a memory section 1808 (including hard disc and the like), and a communication section 1809 (including a network interface card such as a LAN card, modem and the like). The communication section 1809 performs communication processing via a network such as the Internet. A driver 1810 may also be linked to the input/output interface 1805, if needed. If needed, a removable medium 1811, for example, a magnetic disc, an optical disc, a magnetic optical disc, a semiconductor memory and the like, may be installed in the driver 1810, so that the computer program read therefrom is installed in the memory section 1808 as appropriate.

In the case where the foregoing series of processing is achieved through software, programs forming the software are installed from a network such as the Internet or a memory medium such as the removable medium 1811.

It should be appreciated by those skilled in the art that the memory medium is not limited to the removable medium 1811 shown in FIG. 18, which has program stored therein and is distributed separately from the apparatus so as to provide the programs to users. The removable medium 1811 may be, for example, a magnetic disc (including floppy disc (registered trademark)), a compact disc (including compact disc read-only memory (CD-ROM) and digital versatile disc (DVD), a magneto optical disc (including mini disc (MD) (registered trademark)), and a semiconductor memory. Alternatively, the memory medium may be the hard discs included in ROM 1802 and the memory section 1808 in which programs are stored, and can be distributed to users along with the device in which they are incorporated.

To be further noted, in the apparatus, method and system according to the present disclosure, the respective components or steps can be decomposed and/or recombined. These decompositions and/or recombinations shall be regarded as equivalent solutions of the invention. Moreover, the above series of processing steps can naturally be performed temporally in the sequence as described above but will not be limited thereto, and some of the steps can be performed in parallel or independently from each other.

Finally, to be further noted, the term "include", "comprise" or any variant thereof is intended to encompass nonexclusive inclusion so that a process, method, article or device including a series of elements includes not only those elements but also other elements which have been not listed definitely or an element(s) inherent to the process, method, article or device. Moreover, the expression "comprising a(n) . . . " in which an element is defined will not preclude presence of an additional identical element(s) in a process, method, article or device comprising the defined element(s)" unless further defined.

Although the embodiments of the present disclosure have been described above in detail in connection with the drawings, it shall be appreciated that the embodiments as described above are merely illustrative rather than limitative of the present disclosure. Those skilled in the art can make various modifications and variations to the above embodiments without departing from the spirit and scope of the present disclosure. Therefore, the scope of the present disclosure is defined merely by the appended claims and their equivalents.

The invention claimed is:

1. An electronic apparatus for wireless communications, comprising:

transceiving circuitry configured to receive an energy resource mapping table from a network control terminal,
wherein the energy resource mapping table is generated by the network control terminal based on a distribution of network nodes in both time and frequency on an unlicensed frequency band; and
processing circuitry, configured to:
  detect whether the unlicensed frequency band is idle;
  upon detecting that the unlicensed frequency band is idle, sense an energy level of a first broadcast signal transmitted by the network control terminal;
  based on the sensed enemy level and the energy resource mapping table, determine time/frequency transmission resources, among a plurality of time/frequency transmission resources in the unlicensed frequency band allocated to the electronic device, to be used by the electronic device,
wherein the energy resource mapping table includes an upper energy bound and a lower energy bound for the plurality of time/frequency transmission resources allocated to the electronic device; and
wherein the transceiving circuitry is further configured to transmit an uplink signal to the network control terminal aria the determined time/frequency transmission resources.

2. The electronic apparatus according to claim 1, wherein the plurality of time/frequency transmission resources in the unlicensed frequency band are allocated to the electronic device by the network control terminal based on one of an uplink scheduling request transmitted by the electronic device, a predetermined resource allocation rule or based on a history record.

3. The electronic apparatus according to claim 1, wherein the transceiving circuitry is configured to receive the energy resource mapping table from the network control terminal when the electronic apparatus randomly accesses into the unlicensed frequency hand or after the electronic apparatus randomly accesses into the unlicensed frequency band.

4. The electronic apparatus according to claim 1, wherein the transceiving circuitry is configured to receive the energy resource mapping table via radio resource control signaling or via broadcast.

5. The electronic apparatus according to claim 1,
wherein the transceiving circuitry is further configured to receive transmission feedback information about the unlicensed frequency band on the unlicensed frequency band, the transmission feedback information further comprising a re-transmission resource indicator in the case of transmission failure, and
wherein the processing circuitry is configured to determine, when determining to perform re-transmission based on the transmission feedback information, time/frequency transmission resources to be used for the re-transmission based on the re-transmission resource indicator.

6. The electronic apparatus according to claim 5, wherein the re-transmission resource indicator comprises a channel reservation signal, and the processing circuitry determines, based on an enemy value of the channel reservation signal, the time/frequency transmission resources to be used for the re-transmission.

7. The electronic apparatus according to claim 4,
wherein the transceiving circuitry is further configured to receive transmission feedback information about the unlicensed frequency band on a licensed frequency band,
wherein the transmission feedback information comprises an updated energy resource mapping table, and
wherein the processing circuitry is configured to, when determining to perform re-transmission based on the transmission feedback information:
  again detect whether the unlicensed frequency band is idle;
  in the case of the unlicensed frequency band being idle, sense an energy level of a second broadcast signal transmitted by the network control terminal, and
  determine, based on the second broadcast signal and the updated energy resource mapping table, time/frequency transmission resources to be used by the re-transmission.

8. The electronic apparatus according to claim 1, wherein the processing circuitry is further configured to determine time/frequency transmission resources to be used for re-transmission based on a number of times of the re-transmission, when performing the re-transmission.

9. An electronic apparatus for wireless communications, comprising:
processing circuitry, configured to:
  generate, based on a distribution of network nodes in both time and frequency on an unlicensed frequency band, an energy resource mapping table which denotes correspondence between energy of a first broadcast signal to be received by a network node of the network nodes and a plurality of time/frequency transmission resources on the unlicensed frequency band that are allocated to the network node,
  wherein the energy resource mapping table includes an upper energy bound and a lower energy bound for the plurality of time/frequency transmission resources; and
  generate, based on the energy resource mapping table, the first broadcast signal with a particular energy; and
transceiving circuitry configured to:
  transmit the energy resource mapping table and the first broadcast signal to the network node, and
  receive an uplink signal from the network node via time/frequency transmission resources, of the plurality of time/frequency transmission resources, that are determined by the network node based on the energy resource mapping table and an energy level of the first broadcast signal detected by the network node.

10. The electronic apparatus according to claim 9, wherein the processing circuitry is configured to update the energy resource mapping table when the distribution of the network nodes in both time and frequency changes.

11. The electronic apparatus according to claim 9,
wherein the transceiving circuitry is configured to broadcast the first broadcast signal directionally, or
wherein the transceiving circuitry is configured to transmit the First broadcast signal periodically or continuously, or
wherein the transceiving circuitry is configured to transmit the energy resource mapping table when the network node accesses into the unlicensed frequency band or after the network node accesses into the unlicensed frequency band.

12. The electronic apparatus according to claim 9,
wherein the transceiving circuitry is further configured to:
  generate feedback based on a transmission result of the network node on the unlicensed frequency band, and
  detect whether the unlicensed frequency band is idle, and wherein the transceiving circuitry is configured to transmit the feedback on the unlicensed frequency band when the unlicensed frequency band is idle, the feedback further comprising a re-transmission resource indicator when the transmission fails.

13. The electronic apparatus according to claim 12, wherein the re-transmission resource indicator comprises a channel reservation signal, and an energy value of the channel reservation signal is used for determining time/frequency transmission resources to be used by the network node for the re-transmission.

14. The electronic apparatus according to claim 9,
wherein the processing circuitry is further configured to generate feedback based on a transmission result of the network node on the unlicensed frequency band, and
wherein the transceiving circuitry is configured to transmit the feedback on a licensed frequency band, the feedback further comprising an updated energy resource mapping table when the transmission fails.

15. The electronic apparatus according to claim 9, wherein in the case of there being a plurality of sub-carriers, the processing circuitry is configured to generate the energy resource mapping table for each of the plurality of sub-carriers.

16. A method for wireless communications by an electronic device including a processor and a transceiver, the method comprising:
receiving an energy resource mapping table from a network control terminal,
wherein the energy resource mapping table is generated by the network control terminal based on a distribution of network nodes in both time and frequency on an unlicensed frequency band;
detecting whether the unlicensed frequency band is idle;
upon detecting that the unlicensed frequency band is idle, sensing an energy level of a first broadcast signal transmitted by the network control terminal;
based on the sensed energy level and the energy resource mapping table, determining time/frequency transmission resources, among a plurality of time/frequency transmission resources in the unlicensed frequency band allocated to the electronic device, to be used by the electronic device,
wherein the energy resource mapping table includes an upper energy bound and a lower energy bound for the plurality of time/frequency transmission resources allocated to the electronic device; and
transmitting an uplink signal to the network control terminal via the determined time/frequency transmission resources.

17. A method for wireless communications by a network control terminal including a processor and a transceiver, the method comprising:
generating, based on a distribution of network nodes in both time and frequency on an unlicensed frequency band, an energy resource mapping table which denotes correspondence between energy of a first broadcast signal to be received by a network node of the network nodes and a plurality of time/frequency transmission resources that are allocated to the network node,
wherein the energy resource mapping table includes an upper energy bound and a lower energy bound for the plurality of time/frequency transmission resources;
generating, based on the energy resource mapping table, the first broadcast signal with a particular energy;
transmitting the energy resource mapping table and the first broadcast signal to the network node, and
receiving an uplink signal from the network node via time/frequency transmission resources, of the plurality of time/frequency transmission resources, that are determined by the network node based on the energy resource mapping table and an energy level of the first broadcast signal detected by the network node.

* * * * *